(12) United States Patent
Guthals et al.

(10) Patent No.: US 12,688,195 B2
(45) Date of Patent: *Jul. 21, 2026

(54) ELECTRONIC MULTI-TENANT DATA MANAGEMENT SYSTEMS AND CLEAN ROOMS

(71) Applicant: VIDEOAMP, INC., Los Angeles, CA (US)

(72) Inventors: Austin Douglas Guthals, Thousand Oaks, CA (US); Ross Anthony McCray, Pacific Palisades, CA (US); Joseph Wineroth, Los Angeles, CA (US); Phuc Hong Ngo, City of Orange, CA (US); Brian Robert Landry, Los Angeles, CA (US); Steve James Whalen, Santa Monica, CA (US); Christopher Cho, Norco, CA (US); Christian Romano, Portland, OR (US); Ramzi Joseph Nasr, Cypress, CA (US); Ali Beyramzadeh Moghadam, Los Angeles, CA (US)

(73) Assignee: VIDEOAMP, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,400

(22) Filed: Apr. 22, 2022

(65) Prior Publication Data

US 2022/0342874 A1 Oct. 27, 2022

Related U.S. Application Data

(60) Provisional application No. 63/179,139, filed on Apr. 23, 2021.

(51) Int. Cl.
*G06F 16/00* (2019.01)
*G06F 16/23* (2019.01)
(Continued)

(52) U.S. Cl.
CPC ........ *G06F 16/248* (2019.01); *G06F 16/2308* (2019.01); *G06F 16/24554* (2019.01); *G06F 16/278* (2019.01)

(58) Field of Classification Search
CPC .............. G06F 16/248; G06F 16/2308; G06F 16/24554; G06F 16/278
(Continued)

(56) References Cited

U.S. PATENT DOCUMENTS 7,181,438 B1 2/2007 Szabo
7,392,391 B2 6/2008 Eibach et al.
(Continued)

FOREIGN PATENT DOCUMENTS

EP 2890084 A1 7/2015
WO 2021146459 A1 7/2021
(Continued)

OTHER PUBLICATIONS

Office Action in U.S. Appl. No. 17/387,908 mailed Nov. 16, 2021.
(Continued)

*Primary Examiner* — Michelle N Owyang
(74) *Attorney, Agent, or Firm* — Jason W. Croft; Buchalter

(57) ABSTRACT

Disclosed are methods and systems for providing a plurality of data corpuses for anonymization and aggregation. A plurality of data providers validate rules for accessing data by data requesters prior to data availability.

22 Claims, 11 Drawing Sheets

(51) Int. Cl.
    *G06F 16/2455*     (2019.01)
    *G06F 16/248*     (2019.01)
    *G06F 16/27*     (2019.01)

(58) Field of Classification Search
    USPC .................................................. 707/600–899
    See application file for complete search history.

(56) References Cited

U.S. PATENT DOCUMENTS

| | | | |
|---|---|---|---|
| 8,261,256 B1 | 9/2012 | Adler et al. | |
| 8,311,999 B2 | 11/2012 | Todhunter et al. | |
| 8,516,008 B1 | 8/2013 | Marquardt et al. | |
| 9,774,586 B1 * | 9/2017 | Roche | H04L 63/08 |
| 10,037,339 B1 | 7/2018 | Kleinpeter | |
| 10,057,246 B1 * | 8/2018 | Drozd | G06F 21/604 |
| 10,085,073 B2 | 9/2018 | Ray et al. | |
| 10,621,164 B1 | 4/2020 | Kain | |
| 10,685,407 B1 | 6/2020 | Cabrera et al. | |
| 10,950,020 B2 | 3/2021 | Du | |
| 10,970,419 B1 * | 4/2021 | Blum | G06F 16/2282 |
| 11,153,103 B2 * | 10/2021 | Fynaardt | H04L 41/0806 |
| 11,157,944 B2 | 10/2021 | Roullier | |
| 11,263,210 B2 | 3/2022 | McCray et al. | |
| 11,301,464 B2 | 4/2022 | McCray et al. | |
| 12,277,113 B2 | 4/2025 | McCray et al. | |
| 12,411,842 B2 | 9/2025 | McCray et al. | |
| 2003/0154406 A1 | 8/2003 | Honarvar et al. | |
| 2005/0060566 A1 | 3/2005 | Chebolu et al. | |
| 2005/0076022 A1 | 4/2005 | Wu et al. | |
| 2005/0165744 A1 | 7/2005 | Taylor et al. | |
| 2005/0251513 A1 | 11/2005 | Tenazas | |
| 2006/0230447 A1 | 10/2006 | Buchholz | |
| 2007/0016583 A1 | 1/2007 | Lempel et al. | |
| 2007/0283425 A1 | 12/2007 | Ture et al. | |
| 2010/0036884 A1 | 2/2010 | Brown | |
| 2010/0274815 A1 | 10/2010 | Vanasco | |
| 2011/0019915 A1 | 1/2011 | Roman | |
| 2011/0138302 A1 | 6/2011 | Schleifer | |
| 2011/0202774 A1 | 8/2011 | Kratsch | |
| 2012/0084666 A1 | 4/2012 | Hickman | |
| 2012/0131075 A1 | 5/2012 | Mawdsley | |
| 2012/0166389 A1 * | 6/2012 | Shiozawa | G06F 16/128 |
| | | | 707/610 |
| 2013/0204886 A1 | 8/2013 | Faith et al. | |
| 2013/0290234 A1 | 10/2013 | Harris et al. | |
| 2014/0059012 A1 | 2/2014 | Malhotra et al. | |
| 2014/0365363 A1 | 12/2014 | Knudsen et al. | |
| 2015/0081562 A1 | 3/2015 | Roullier et al. | |
| 2015/0081918 A1 | 3/2015 | Nowack | |
| 2015/0244539 A1 | 8/2015 | Ickman et al. | |
| 2015/0326627 A1 | 11/2015 | Merrifield | |
| 2016/0050272 A1 | 2/2016 | Raduchel | |
| 2016/0162693 A1 * | 6/2016 | Breuer | G06F 3/0637 |
| | | | 713/164 |
| 2017/0026343 A1 | 1/2017 | Wardman | |
| 2017/0139965 A1 | 5/2017 | Marquardt et al. | |
| 2017/0171214 A1 * | 6/2017 | Anderson | G06F 16/27 |
| 2017/0289191 A1 | 10/2017 | Thioux et al. | |
| 2018/0082237 A1 | 3/2018 | Nagel et al. | |
| 2018/0113866 A1 | 4/2018 | Bendersky et al. | |
| 2018/0157794 A1 | 6/2018 | Fusi et al. | |
| 2018/0239897 A1 * | 8/2018 | Ventura | G06F 21/57 |
| 2018/0276213 A1 | 9/2018 | Ramamurthy et al. | |
| 2018/0336543 A1 | 11/2018 | van Os et al. | |
| 2019/0026709 A1 | 1/2019 | Baron | |
| 2019/0087835 A1 | 3/2019 | Schwed et al. | |
| 2019/0147076 A1 | 5/2019 | Yang et al. | |
| 2019/0147451 A1 | 5/2019 | Deutschmann et al. | |
| 2019/0205050 A1 | 7/2019 | Koorapati et al. | |
| 2019/0243921 A1 | 8/2019 | Long et al. | |
| 2019/0342096 A1 * | 11/2019 | Starosielsky | H04L 63/0428 |
| 2019/0362083 A1 | 11/2019 | Ortiz et al. | |
| 2019/0362101 A1 | 11/2019 | Fisse et al. | |
| 2020/0067933 A1 | 2/2020 | Kukreja et al. | |

| | | | |
|---|---|---|---|
| 2020/0244626 A1 | 7/2020 | Kwon et al. | |
| 2020/0379995 A1 | 12/2020 | Rajaperumal et al. | |
| 2021/0004782 A1 | 1/2021 | Toutain et al. | |
| 2021/0014141 A1 * | 1/2021 | Patil | H04W 76/25 |
| 2021/0090126 A1 | 3/2021 | Schobeiri et al. | |
| 2021/0099502 A1 | 4/2021 | Stern et al. | |
| 2021/0133196 A1 | 5/2021 | Gladwin et al. | |
| 2021/0150269 A1 | 5/2021 | Choudhury et al. | |
| 2021/0210168 A1 | 7/2021 | Fusi et al. | |
| 2021/0216537 A1 | 7/2021 | McCray et al. | |
| 2021/0224290 A1 * | 7/2021 | Chu | G06F 21/6227 |
| 2021/0295209 A1 * | 9/2021 | Lancioni | G06N 3/088 |
| 2021/0318990 A1 * | 10/2021 | Dhanabalan | G06F 16/13 |
| 2021/0357393 A1 | 11/2021 | McCray et al. | |
| 2021/0357394 A1 | 11/2021 | McCray et al. | |
| 2021/0357395 A1 | 11/2021 | McCray et al. | |
| 2022/0035949 A1 | 2/2022 | Blum et al. | |
| 2023/0395253 A1 * | 12/2023 | Long | G16H 40/67 |

FOREIGN PATENT DOCUMENTS

| | | |
|---|---|---|
| WO | 2022226545 A1 | 10/2022 |
| WO | 2023102143 A1 | 6/2023 |

OTHER PUBLICATIONS

International Search Report and Written Opinion for PCT/US2021/013484 mailed Apr. 22, 2021.

Office Action in U.S. Appl. No. 16/742,721 mailed Sep. 17, 2021.

Final Office Action in U.S. Appl. No. 17/387,908 mailed Apr. 15, 2022.

International Search Report and Written Opinion in PCT/US2022/071886 mailed Jul. 6, 2022.

Akeel F.Y., "Secure Data Integration Systems", Thesis for the degree of Doctor of Philosophy, Oct. 1, 2017, 247 pages, XP093100049, p. 16, line 6 * * p. 21, line 23-p. 22, line 10 * * p. 29, line 7-p. 30, line 20 * * p. 49, line 3-p. 50, line 4 * * p. 61, lines 7-9 * * p. 78, line 8-p. 79, line 23 * * p. 140, lines 20-24 * * tables 5.24, 6.1 *.

Final Office Action for U.S. Appl. No. 17/387,908, dated Nov. 23, 2022, 13 pages.

International Preliminary Report on Patentability for International Application No. PCT/US2022/071886, mailed Nov. 2, 2023, 7 Pages.

Non-Final Office Action for U.S. Appl. No. 17/383,333, dated Jun. 14, 2023, 21 pages.

Non-Final Office Action for U.S. Appl. No. 17/383,333, dated Sep. 21, 2022, 8 pages.

Non-Final Office Action for U.S. Appl. No. 17/387,908, dated Aug. 4, 2022, 12 pages.

Non-Final Office Action for U.S. Appl. No. 17/387,908, dated Jun. 7, 2023, 14 pages.

Non-Final Office Action for U.S. Appl. No. 18/073,463, dated Feb. 28, 2023, 9 pages.

Notice of Allowance for U.S. Appl. No. 17/383,333, dated Feb. 9, 2023, 8 pages.

Notice of Allowance for U.S. Appl. No. 18/073,463, dated Jun. 28, 2023, 8 pages.

Supplementary European Search Report in European Patent Application No. 21740702.2, dated Nov. 17, 2023, 9 Pages.

Final Office Action for U.S. Appl. No. 17/383,333, dated Apr. 5, 2024, 15 pages.

Final Office Action for U.S. Appl. No. 17/387,908, dated Jan. 26, 2024, 13 pages.

International Preliminary Report on Patentability for International Application No. PCT/US2022/051579, dated Jun. 13, 2024, 10 pages.

Office Action for Chinese Application No. 20218013612, dated Jun. 26, 2024, 8 pages.

Examination report No. 1 for Australian Application No. 2022261181, dated Jun. 6, 2024, 3pgs.

Non-Final Office Action for U.S. Appl. No. 17/383,333, dated Oct. 17, 2024, 18 pages.

* cited by examiner

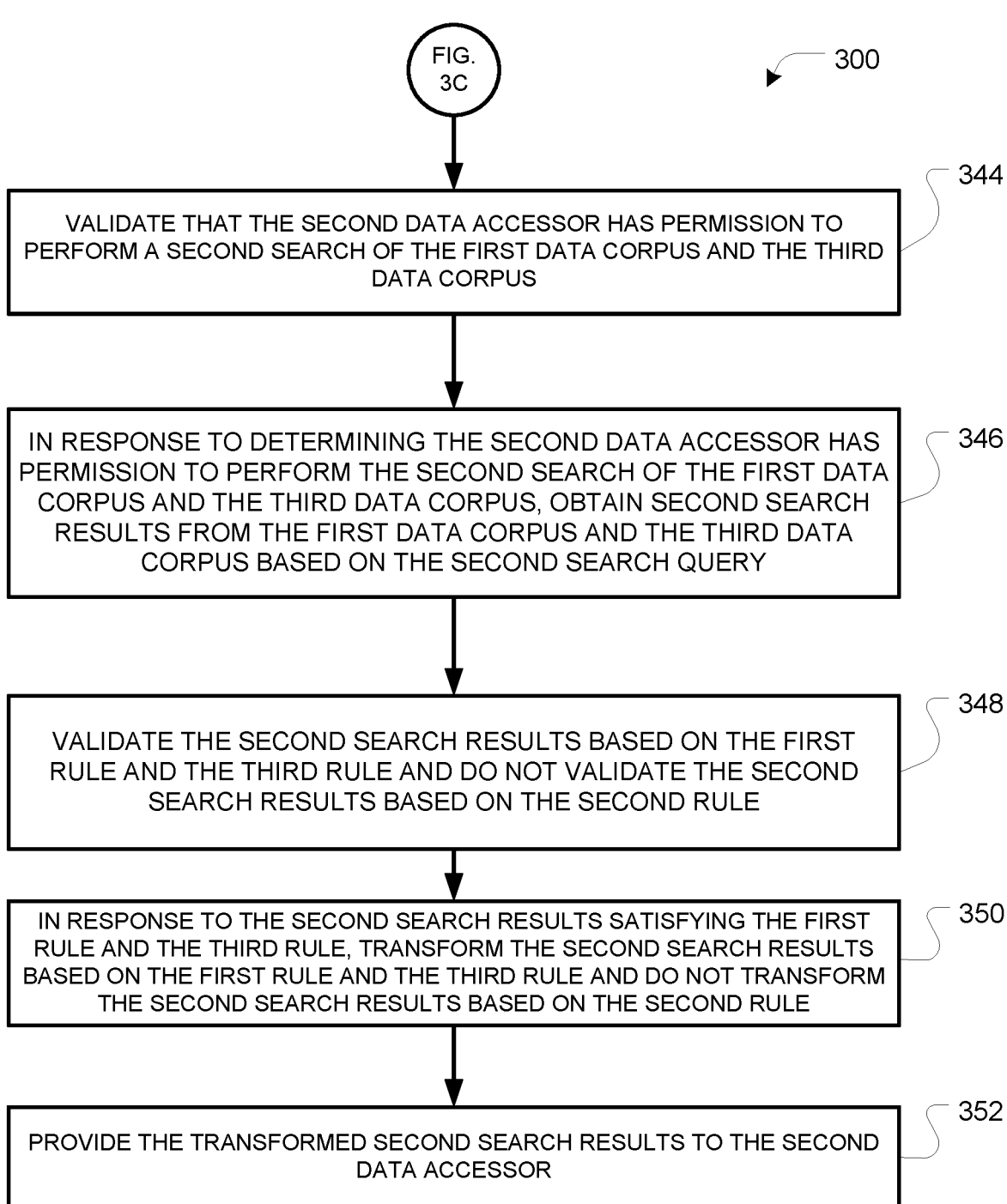

VALIDATE THAT THE SECOND DATA ACCESSOR HAS PERMISSION TO PERFORM A SECOND SEARCH OF THE FIRST DATA CORPUS AND THE THIRD DATA CORPUS

344

IN RESPONSE TO DETERMINING THE SECOND DATA ACCESSOR HAS PERMISSION TO PERFORM THE SECOND SEARCH OF THE FIRST DATA CORPUS AND THE THIRD DATA CORPUS, OBTAIN SECOND SEARCH RESULTS FROM THE FIRST DATA CORPUS AND THE THIRD DATA CORPUS BASED ON THE SECOND SEARCH QUERY

346

VALIDATE THE SECOND SEARCH RESULTS BASED ON THE FIRST RULE AND THE THIRD RULE AND DO NOT VALIDATE THE SECOND SEARCH RESULTS BASED ON THE SECOND RULE

348

IN RESPONSE TO THE SECOND SEARCH RESULTS SATISFYING THE FIRST RULE AND THE THIRD RULE, TRANSFORM THE SECOND SEARCH RESULTS BASED ON THE FIRST RULE AND THE THIRD RULE AND DO NOT TRANSFORM THE SECOND SEARCH RESULTS BASED ON THE SECOND RULE

350

PROVIDE THE TRANSFORMED SECOND SEARCH RESULTS TO THE SECOND DATA ACCESSOR

IDENTIFY A CANDIDATE FOR AN ATTESTATION

604

SEND THE CANDIDATE FOR AN ATTESTATION FOR APPROVAL

606

RECEIVE A RESPONSE REGARDING AN ATTESTATION OF THE CANDIDATE FOR AN ATTESTATION

608

STORE THE RESPONSE

ELECTRONIC MULTI-TENANT DATA MANAGEMENT SYSTEMS AND CLEAN ROOMS

CROSS-REFERENCE

This application claims the benefit of U.S. Provisional Application No. 63/179,139, filed Apr. 23, 2021, entitled Data Cleanroom which application is incorporated herein in its entirety by reference.

TECHNICAL FIELD

Embodiments of the present disclosure relate to the field of electronic multi-tenant data management systems, data aggregation, and data mining.

BACKGROUND

Ecommerce is ruled by data. It is well known that companies with access to large amounts of data can achieve a competitive commercial advantage with appropriate analysis. Moreover, access to competitor data is also potentially beneficial within an industry. However, managing data from multiple data providers (or competitors) presents a variety of problems including privacy requirements, regulatory and legal requirements, and resolution issues, making operations involving electronic multi-tenant data difficult and potentially risky. What is needed are systems and methods for managing data from multiple data providers that provides for attestation and approval process for securely handling data aggregation and access by other data providers.

SUMMARY

Disclosed are systems and methods for managing data from multiple data providers that provide for an attestation and approval process for securely handling data aggregation and access by other data providers. A method may include obtaining a first data corpus from a first data provider and a second data corpus from a second data provider. The method may also include correlating the first data corpus with the second data corpus. The method may further include identifying a first rule associated with performing searches of the first data corpus. The method may also include identifying a second rule associated with performing searches of the second data corpus. The method may further include obtaining a first search query from a first data accessor to search the first data corpus and the second data corpus. The method may also include validating that the first data accessor has permission to perform a first search of the first data corpus and the second data corpus. The method may further include obtaining first search results from the first data corpus and the second data corpus based on the first search query in response to determining the first data accessor has permission to perform the first search of the first data corpus and the second data corpus. The method may also include validating the first search results based on the first rule and the second rule. The method may further include transforming the first search results based on the first rule and the second rule in response to the first search results satisfying the first rule and the second rule. The method may also include providing the transformed first search results to the first data accessor.

INCORPORATION BY REFERENCE

All publications, patents, and patent applications mentioned in this specification are herein incorporated by reference to the same extent as if each individual publication, patent, or patent application was specifically and individually indicated to be incorporated by reference.

U.S. Pat. No. 10,085,073 B2 issued Sep. 25, 2018, to McCray et al.;

US 2021/0357393 A1 published Nov. 18, 2021, to McCray et al.;

US 2021/0357394 A1 published Nov. 18, 2021, to McCray et al.; and

US 2021/0357395 A1 published Nov. 18, 2021, to McCray et al.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 3A-3D illustrate example flow diagrams of an example computer-implemented method to perform a search of an electronic multi-tenant data management system;

DETAILED DESCRIPTION

Figure 1:
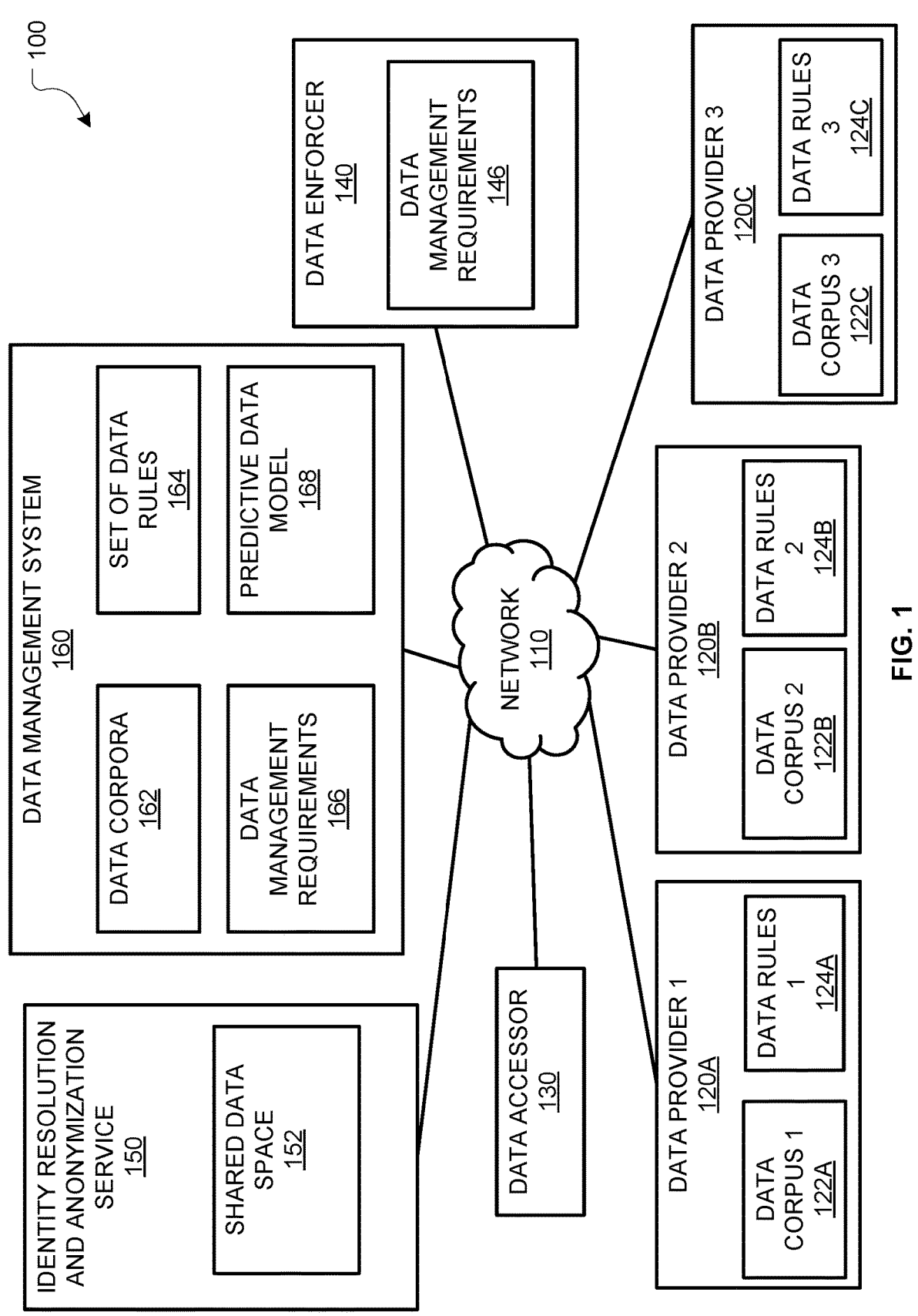
FIG. 1 illustrates an example environment related to an electronic multi-tenant data management system.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Users generate data across a variety of platforms. Each of these platforms may obtain data relative to particular habits and/or activities of users. For example, web-based shopping sites may obtain a shopping history of a user, a purchase history of a user, a search history of a user, browsing history of a user, and other information. A video streaming service may have a viewing history of a user, a search history of a user, customer ratings submitted by the user, and other information. A social media site may have a list of topics, pages, and/or companies that a user has "liked", subjects and content of posts by a user, a list of topics, pages, and/or companies that a user has "followed", comments submitted by a user, and other information. In today's digital age, users may interact with multiple platforms and services each day. The multiple platforms and services are typically owned and operated by different entities that do not share their data with others. It may be beneficial for companies to be able to search data from multiple different sources to identify a more full picture of user activity, identify trends for a user and among multiple users, improve the targeting of advertising for individuals, and/or measure how successful advertising campaigns are, among others.

However, searching and analyzing data across different companies, platforms, and services may be difficult and/or impossible for a variety of reasons. If user data is not hidden, encrypted or anonymized, companies may be hesitant to share their own data with competitors, particular when the data may help competitors target the companies' customers. For example, a social media site may have little incentive to share its collection of data about users with a video streaming company or a web-based shopping site. Additionally, legal restrictions, including privacy regulations, may regulate the dissemination or use of personally identifying information, preventing one company from sharing information it gathers with other companies.

Aspects of the present disclosure address these and other shortcomings of prior systems by improving the sharing of data across computing systems. The present disclosure provides an electronic multi-tenant data management system that entities can use to cross-share data among other entities, while still maintaining privacy of user information and company proprietary information. Using the electronic multi-tenant data management system, entities can have access to a more full set of data about a user and/or a set of users. This increased access may enable the companies to provide better electronic data services, such as advertising, to users. Additionally, electronic multi-tenant data management systems may facilitate the verification of compliance with regulatory restrictions on the sharing and use of information.

FIG. 1 illustrates an example environment 100 in which embodiments of the present disclosure can be implemented. The environment 100 may include a network 110, a data provider 1 120A, a data provider 2 120B, and a data provider 3 120C (collectively the data providers 120), a data accessor 130, a data enforcer 140, an identity resolution and anonymization service 150, and a data management system 160.

In some embodiments, the network 110 may include a public network (e.g., the Internet), a private network (e.g., a local area network (LAN) or a wide area network (WAN)), a wired network (e.g., an Ethernet network), a wireless network (e.g., an 802.11 network, Bluetooth network, or a Wi-Fi network), a cellular network (e.g., a Long Term Evolution (LTE) or LTE-Advanced network), routers, hubs, switches, server computers, and/or a combination thereof.

Each of the data providers 120, the data accessor 130, the data enforcer 140, the identity resolution and anonymization service 150, and the data management system 160 may be or include a computing device such as a personal computer (PC), a laptop, a server, a mobile phone, a smart phone, a tablet computer, a netbook computer, an e-reader, a personal digital assistant (PDA), or a cellular phone etc.

Although FIG. 1 depicts three data providers 120, in some embodiments the environment 100 may include any number of data providers 120. The data providers 120 may be associated with different entities that may generate and/or obtain data associated with users. For example, the data providers 120 may be associated with video streaming companies, web-based shopping companies, social media companies, search engines, e-commerce companies, and/or other any other type of company. For example, the data provider 1 120A may be associated with a video streaming company and/or platform, the data provider 2 120B may be associated with a web-based auction company, and the data provider 3 120C may be associated with a search engine.

Each of the data providers 120 may be configured to obtain data associated with users of services provided by the data providers 120. Continuing the above example, the data provider 1 120A may obtain data associated with a variety of customers as the data corpus 1 122A. The data corpus 1 122A may include user names, user ids, emails, hashed emails, addresses, billing information, user preferences, user settings, user search histories, user viewing histories, user ratings, etc. For example, the data corpus 1 122A may include a listing of each video streamed by each user together with a time when each video was streamed, a location where each video was streamed, a number of times each video was streamed, any ratings submitted by a user associated with any videos streamed by the user, searches performed by the user, internet-based activities made by the user, electronic activities made by the user, purchases made by the user, language settings of the user including subtitles, captions, language tracks, and other data of the user. In some embodiments, the data corpus 1 122A may correlate data with particular users based on a user's name, user identification, email address, billing information, etc.

Similarly, the data provider 2 120B may obtain data associated with a variety of customers as the data corpus 2 122B. The data corpus 2 122B may include similar data as the data corpus 1 122A but may be associated with, in this example, a web-based auction company. For example, the data corpus 2 122B may include a listing of each auction that is being tracked by each user, each bid and purchase made by each user, product ratings submitted by each user relative to purchases made by the user, buyer and/or seller ratings associated with each user, searches performed by each user, items each user has listed for sale, a user's physical location, etc. In some embodiments, the data corpus 2 122B may correlate data with particular users based on a user's name, user identification, email address, billing information, etc.

Similarly, the data provider 3 120C may obtain data associated with a variety of customers as the data corpus 3 122C. The data corpus 3 122C may include similar data as the data corpus 1 122A and the data corpus 2 122B but may be associated with, in this example, a search engine. For example, the data corpus 3 122C may include a listing of each search performed by each user, the sequence of each search performed by each user, a timing of each search performed by each user, each search result that is examined by each user (e.g. each search result that is opened, read, clicked, etc.), and other data. In some embodiments, the data corpus 3 122C may correlate data with particular users based on a user's name, user identification, email address, billing information, etc.

The data corpora 122 may additionally include other information such as, for example, tracked locations of user input (e.g., tracking where a user clicks, where a user moves a mouse, where a user drags a finger on a touchscreen), tracked keystrokes of users, tracked eye movement and eye focus of users, advertisements that are visited by each user, purchase and return history for each user, location of users, demographic information about users such as the users age, ethnicity, education level, income level, gender, etc. and other user data.

In situations in which the systems discussed here collect personal information about users, or may make use of personal information, the users may be provided with an opportunity to control whether programs or features collect user information (e.g., information about a user's social network, social actions, interactions or activities, profession, a user's preferences, a user's viewing history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data corpora 122 may be shared, on a full or limited basis, to the data management system 160. Each of the data providers 120 may also include corresponding data rules 124 that dictate how the respective data corpus may be shared, used, access, etc. by other data providers 120 that can access the data management system. 160. For example, the data provider 1 120A may include data rules 1 124A, the data provider 2 120B may include data rules 2 124B, and the data provider 3 120C may include data rules 3 124C. The data rules 124 may include restrictions on access to the data corpora 122. For example, the data rules 1 124A may include rules established by the data provider 1 120A for accessing the data corpus 1 122A. The data rules 1 124A may include a list of individuals, corporations, and/or entities who may access the data corpus 1 122A via the data management system 160. Additionally or alternatively, in some embodiments, the data rules 1 124A may include a permission list which may grant different individuals, corporations, and/or entities different levels of access to the data corpus 1 122A. For example, a first entity may have full access while a second entity may only have access to a subset of the data corpus 1 122A. In addition, data rules 124 may include a list of data providers 120, the type of data from each data provider that can be correlated with data corpus 122, and/or and a particular permitted purpose or non-permitted purpose.

The data rules 1 124A may also include privacy requirements. For example, the privacy requirements may include a requirement for a minimum number of user data to be disclosed in response to a search query such as a minimum bin aggregation rule. For example, the minimum bin aggregation may be 100 users. The user data may be shared on an individual basis, or the user data may be aggregated. If a search results in fewer than 100 results, the search results of the data corpus 1 122A may not be disclosed as the number of search results may not satisfy the minimum bin aggregation rule. Additionally or alternatively, if the search results in fewer than 100 results, the search results of the data corpus 1 122A may not be aggregated and the aggregated data may not be shared. In at least one embodiment, user data that is shared is anonymized and personally identifiable user information is removed and/or hidden from being identified by data providers other than the data provider that is sharing the data. In some embodiments, search results may need to satisfy multiple data rules 124 such as the data rules 1 124A and the data rules 2 124B. In these and other embodiments, the data rules 1 124A may include a first minimum bin aggregation rule and the data rules 2 124B may include a second minimum bin aggregation rule. If the first minimum bin aggregation rule is stricter (i.e., greater)

than the second minimum bin aggregation rule, the search results may only need to satisfy the first minimum bin aggregation rule. In an alternative embodiment, if the minimum bin aggregation is 100, for example, and the search results are fewer than 100 results, a catch all bin may be used to report on all metrics that did not meet the minimum bin aggregation rule. This catch all bin can either be separate for each data provider rule or a single bin for all data provider rules at the strictest (greatest) rule. In addition the catch-all bin may or may not expose the pertinent metadata in the search to satisfy various privacy .requirements (e.g., a differential privacy requirement).

The data rules 1 124A may also include data transformation rules. For example, the data transformation rules may include a requirement for grouping of search results into bins. For example, in response to a search query, results from the data corpus 1 122A may be grouped into bins of a particular size and/or the number of search results may be rounded to the nearest bin size. When the bin size is 30, the results may be rounded to the nearest 30. Alternatively or additionally, in some embodiments, data transformations may include fuzzing of data. For example, rather than providing exact values for data included in the data corpus 1 122A, the data management system 160 may provide the values of the data modified by a relatively small random amount, or data that has been aggregated. In addition, each data provider may include its own confidential data fuzzing rules so that it can account for fuzzing of its own data when the same entity is also the data accessor. For example, using these fuzzing rules, the data provider may filter out their own data from any results to provide different data resolution.

Each of the data providers 120 may provide its corresponding data corpus 122 and data rules 124 to the data management system 160 and may be subject to the respective data rules 124. Provider-specific data rules may include user-base size estimate protections. For example, data providers may consider a logged-in user count to be material nonpublic information. The data management system 160 can allow data providers to introduce sampling, fuzzing, sketch, or a probabilistic privacy preserving population estimate to protect the true size estimate of the data provider logged in user base. Any sampling may be verified by cleanroom partners (e.g., any data provider 120 that may contribute to the shared data space 152) to conform to any pre-existing conditions for down-sampling, preventing bias, or non-random noise.

The data accessor 130 may be associated with any entity, including the same or different entities associated with the data providers 120. In some embodiments, the data accessor 130 may be granted permission to perform searches of one or more the data corpora 122 via the data management system 160. In these and other embodiments, the data accessor 130 may be listed as a party that may access the data corpora 122 subject to the data rules 124. In some embodiments, the data accessor 130 may have access to search some data corpora 122 and may not have access to search other data corpora 122. For example, the data rules 1 124A and data rules 2 124B may list the data accessor 130 as an entity that may perform searches of the data corpus 1 122A and the data corpus 2 122B while the data rules 3 124C do not list the data accessor 130 as a permissioned party. Thus, when attempting to perform a search using the data management system 160, the search results may not include results associated with the data corpus 3 122C.

The data enforcer 140 may be associated with a third-party such as, for example, a government entity. For example, the data enforcer 140 may be associated with a regulatory body that works to ensure that data gathered by the data providers 120 and accessed by the data providers 120 and/or the data accessor 130 conform to data management requirements 146. For example, in some jurisdictions, the data management requirements 146 may not permit the gathering of data from minors without consent. Alternatively, in some embodiments, the data management requirements 146 may not permit targeted advertising to minors or to others. Additionally or alternatively, in some jurisdictions, data management requirements 146 may not permit the dissemination of personally identifying information by the party that gathered it to other parties. For example, in some jurisdictions, the data management requirements 146 may allow the data provider 1 120A to gather personally identifying information for use in billing, providing services, etc. but may not allow the data provider 1 120A to sell or distribute that data to other parties. The data enforcer 140 may use the data management system 160 to verify compliance with the data management requirements 146. Alternatively, the data enforcer 140 may be operated and/or managed by the data management system 160, the identity resolution and anonymization service 150. The data enforcer 140 may include a correlation of rules from the first data provider and the second data provider.

The identity resolution and anonymization service 150 may be configured to obscure and/or remove any personally identifying information of the data corpora 122 prior to transmittal of the data corpora 122 to the data management system 160. In some embodiments, the identity resolution and anonymization service 150 may associate the data of the data corpora 122 with an identifier through a process (e.g., a one-way process) such that information from two different data corpora 122 associated with a particular individual may be correlated with each other without revealing the identity of the particular individual. For example, the identity resolution and anonymization service 150 may anonymize and/or remove from the data corpora 122 names, physical addresses, Internet Protocol (IP) addresses, phone numbers, email addresses, credit records, billing information, etc. In some embodiments, the identity resolution and anonymization service 150 may anonymize the data corpora 122 such that the anonymized identifier of a particular user is the same across each of the data corpora 122 in which the particular user's data appears. In some embodiments, the identity resolution and anonymization service 150 may use a live random access memory (RAM) internal identification to generate the anonymized identifier.

In some embodiments, the identity resolution and anonymization service 150 may attempt to protect personally identifiable information by being configured to act as a shared data space 152 with restricted access. In some embodiments, the shared data space 152 may be configured as a "cleanroom." A data cleanroom may refer to an environment where some or all data is anonymized, processed and stored to be made available for measurement, or data transformations in a privacy-focused way. For example, two data providers 120 may desire to share their respective data corpora 122 with one another. The two data providers 120 may then enter into a contract to share data. Responsive to receiving a request from both data providers 120 to create a shared data space 152, the identity resolution and anonymization service 150 may create the shared data space 152. The shared data space 152 may be accessed using one or more of a service account and an encryption key. The shared data space 152 may include some or all of the respective data corpora 122 from both of the data providers 120. Access to the shared data space 152 may be restricted using the service account. A service account may refer to a specific account that has been created for the purpose of accessing a particular shared data space. Additionally or alternatively, access to the shared data space 152 may be restricted using the encryption key. The encryption key, for example, may limit access only to those data providers 120 that have entered into a contract with one another. Further, an encryption key may only provide one-way access to the data providers 120 that have access to the key. Additionally, an encryption key may be generated by Hash-based Message Authentication Code (HMAC), Advanced Encryption Standard (AES), Rivest-Shamir-Adleman (RSA), Triple Data Encryption Standard (TripleDES), or any other method for encrypting data. Data providers 120 that have an encryption key and access to a shared data space 152 may desire to have additional data providers 120 and their data corpora 122 joined to the shared data space 152 In such scenario, a third data provider 120 may be provided an encryption key that grants access to the shared data space 152 already created by the first two data providers 120. In at least one embodiment, the encryption key is shared after permission is given by all data providers that currently have access to the encryption key.

In at least some embodiments, the systems provided herein may support asynchronous encryption in which each data provider 120 may use the same public key to encrypt their data corpus. Each data provider 120 may also receive their own compound private key. Only when the data enforcer 140 determines a data provider's data policy has been met will the data provider 120 be able to share their compound private key. In shared data scenarios, all of the data provider's compound private keys are shared with the data enforcer 140 before the data can be decrypted and accessed in the shared data space 152 by any of the data providers 120. This in effect enforcers all data rules (124 (e.g., data rules 1 124A, data rules 2 124B, data rules 3 124C) are satisfied before any data can be decrypted and accessed by a data accessor 130.

In at least some embodiments, the keys may be generated and managed by the identity resolution and anonymization service 150. Additionally or alternatively, the keys may be generated and managed by a separate encryption key management service. The identity resolution and anonymization service 150 (or separate encryption key management service) can be used to generate and secure explicit public keys and compound private keys for each report. Whichever entity generate and/or manages the key is referred to as a "key management service." In at least some embodiments, the key management service may purge keys as soon as possible to minimize the possibility of a data breach.

Additionally, in some embodiments, the data providers may create their own secret private key as part of the data rules (124 (e.g., data rules 1 124A, data rules 2 124B, data rules 3 124C). In this scenario, each data provider only has access to its own private key that is needed for decryption. Each data provider may then make a call to a shared anonymization service 150 to create an asynchronous encryption key that is then shared with another data provider (s), such as the data provider 1, data provider 2, and data provider 3. This can be performed in a way such that the data provider specific secret private keys are encrypted during transit and during computation of the asynchronous encryption key. A confidential compute service may be used to ensure the secret data provider specific keys are never exposed to another entity unless all the data rules have been satisfied. The asynchronous encryption key is then used to encrypt data corpus 1 122A, data corpus 2 122B, and data corpus 3 122C before it can be searched, correlated, or processed through a predictive data model. In this example each data provider will share their portion of the compound decryption key to the anonymization service 150 after they are satisfied their data rules have been met by the data enforcer 140. Only once all compound encryption keys have been provided from each data provider (120 (e.g., data provider 1, data provider 2, and data provider 3) can the results of the search, correlation, or predictive data model get shared to the data accessor 130.

In at least some embodiments, no single data provider or data accessor has all of the compound private keys needed to decrypt the report unless all data providers approve that their corresponding data policy rules have been met. In at least some embodiments, no party will receive the public key and instead may rely on the encryption service to handle encryption. This is to have more granular control over the lifespan of a public key. The goal is to remove keys as soon as possible to prevent misuse of keys. For example we can purge the public key after all parties have marked their entry in the job table as 'data available'. This may help prevent any party from using brute force to check well known values in encrypted dimensions.

The data management system 160 may be configured to receive the data corpora 122 from each of the data providers 120 and correlate the data corpora 122 with each other as the data corpora 162. In some embodiments, the data management system 160 may obtain the data corpora 122 after the identity resolution and anonymization service 150 has anonymized any personally identifying information from the data corpora 122. In some embodiments, the data corpora 162 may include an identification of the source of the data, i.e. whether a particular data corpus of the data corpora 162 came from data provider 1 120A, data provider 2 120B, and/or data provider 3 120C. The data management system 160 may identify and correlate data associated with a user, or a group of users in the data corpora 162 and store the correlated data as a searchable record or index.

In some embodiments, the data management system 160 may correlate the data corpora 122 using a identifier, such as a common value, or common join key, hashed email (HEM) address, user ID, or any other common key or join that can be matched, or a non-personally identifying identifier. For example, each of the data corpora 122 may include multiple groups of data, each group of data associated with a particular non-personally identifying identifier. As described above, the non-personally identifying identifiers may be generated by the identity resolution and anonymization service 150. The non-personally identifying identifiers may be generated in such a way that the same non-personally identifying identifier is generated for a group of data associated with a particular individual regardless of whether the group of data is in the data corpus 1 122A, the data corpus 2 122B, or the data corpus 3 122C. The data management system 160 may thus correlate the data corpora by identifying a first group of data in the data corpus 1 122A associated with a particular non-personally identifying identifier, a second group of data in the data corpus 2 122B associated with the same particular non-personally identifying identifier, and a third group of data in the data corpus 3 122C associated with the same particular non-personally identifying identifier, and then correlating the first group of data with the second group of data and the third group of data.

The data management system 160 may be configured to obtain the data rules 124 from each of the data providers 120 as the set of data rules 164. In some embodiments, the set of data rules 164 may include an identification of the source of the data rules, i.e. whether particular data rules of the set of data rules 164 came from data provider 1 120A, data provider 2 120B, and/or data provider 3 120C.

The data management system 160 may be configured to obtain the data management requirements 146 from the data enforcer 140 as the data management requirements 166.

The data management system 160 may be configured to process, verify, and/or validate search queries received from the data providers 120, the data accessor 130, and/or the data enforcer 140 to search the data corpora 162 using the set of data rules 164 and the data management requirements 166 as described below relative to FIG. 2. In some embodiments, the data management system 160 may also be configured to grant access to the data enforcer 140 to verify compliance with the data management requirements 166, to verify the contents of the data corpora 162.

The data management system 160 may be configured to generate a predictive data model 168 of the data corpora 162. The predictive data model 168 may be generated using machine learning and predictive analytics on the data corpora 162. For example, a generative adversarial network (GAN) or a privacy-preserving adversarial network (PPAN) may be applied to the data corpora 162 to generate the predictive data model 168 based on the data corpora 162. Additionally, the predictive data model 168 may be trained on the real data sets contained in the "virtual cleanroom" or shared data space 152, which may limit access to the predictive data model 168 to those data providers 120 that have an encryption key to the shared data space 152, and which may restrict data providers 120 from creating their own model on the actual data in the shared data space 152. The predictive data model 168 may be used for data providers 120 to predict behaviors, tendencies, and/or trends related to the data corpora 162 that is aggregated in the data management system 160. The predictive data model 168 may allow an individual data provider 120 a more accurate predictive model by combining data corpora 162 from more than one different data providers 120. Additionally, the predictive data model 168 may allow the shared data space 152 to maintain the privacy of the data corpora 162 by not allowing data providers 120 to develop their own predictive data models on the data corpora 162. For example, data provider 1 120A may provide data corpus 1 122A to a shared data space 152 and data provider 2 120B may provide data corpus 2 122B to the same shared data space 152. A predictive data model 168 may be generated on the combined data corpora 162 that data provider 1 120A and data provider 2 120B have contributed, without disclosing all the data to either of the data providers 120. The predictive data model 168 may be more accurate and complete than any one data provider 120 could develop on their own data corpora 122.

A data provider 120 may enforce any security and/or data policies before allowing the data to be decrypted and leave the shared data space 152. Example security and/or data policies may include: ensuring raw row-level data shared into the shared data space 152 for a specific report has been purged, ensuring minimum bin/aggregation thresholds on specific dimensions have been met (e.g., the data management system 160 may model data that is below the minimum bin/aggregation thresholds and only extract the model or function coefficients when it cannot meet minimum bin/aggregation thresholds; e.g., the modeling can be a data science model, a machine learning model, an approximation function, or any non-deterministic function), ensuring that dimension sets can be used in a report, ensuring that dimension sets can be shared with a data accessor, ensuring that dimension values and corresponding metrics can be used in a report, ensuring that dimension values and corresponding metrics can be shared with a data accessor, ensuring that metrics are within valid ranges before sharing with a data accessor, ensuring that report types and use cases are authorized for each data accessor and set of dimensions. For example, a data provider may only allow its data to be used for measurement but not for forecasting or measurement for a specific data accessor but not for another.

Additions, deletions, and modifications may be made to the environment 100 of FIG. 1. In some embodiments, the environment 100 may include more or fewer than three data providers 120. Alternatively or additionally, in some embodiments, the environment 100 may not include a data accessor 130 or may include multiple data accessors 130. Alternatively or additionally, in some embodiments, the data accessor 130 may be the same entity as one or more of the data providers 120. In some embodiments, the environment 100 may not include the data enforcer 140 or may include multiple data enforcers 140. For example, in these and other embodiments, the environment 100 may include multiple data enforcers 140 and each data enforcer 140 may correspond with a particular jurisdiction and may include data management requirements 146 associated with the particular jurisdiction.

In some embodiments, the environment 100 may not include the identity resolution and anonymization service 150. In these and other embodiments, each data provider 120 may perform its own data anonymization to remove personally identifying information from its respective data corpus 122. Alternatively or additionally, the data management system 160 may perform the removing of personally identifying information from the data corpora 122.

Figure 2:
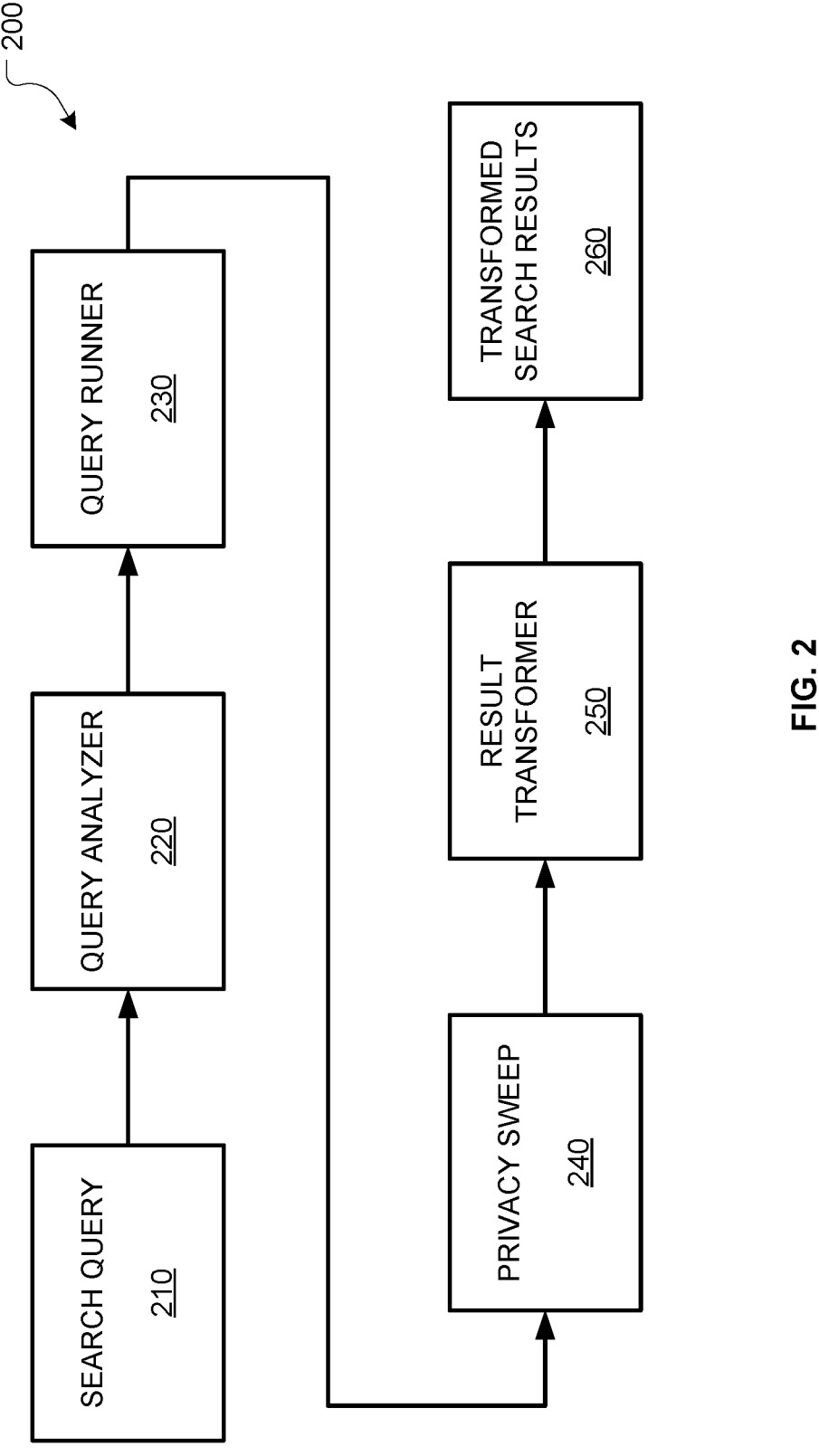
FIG. 2 illustrates an example system related to performing a search in an electronic multi-tenant data management system.
Figure 3A:
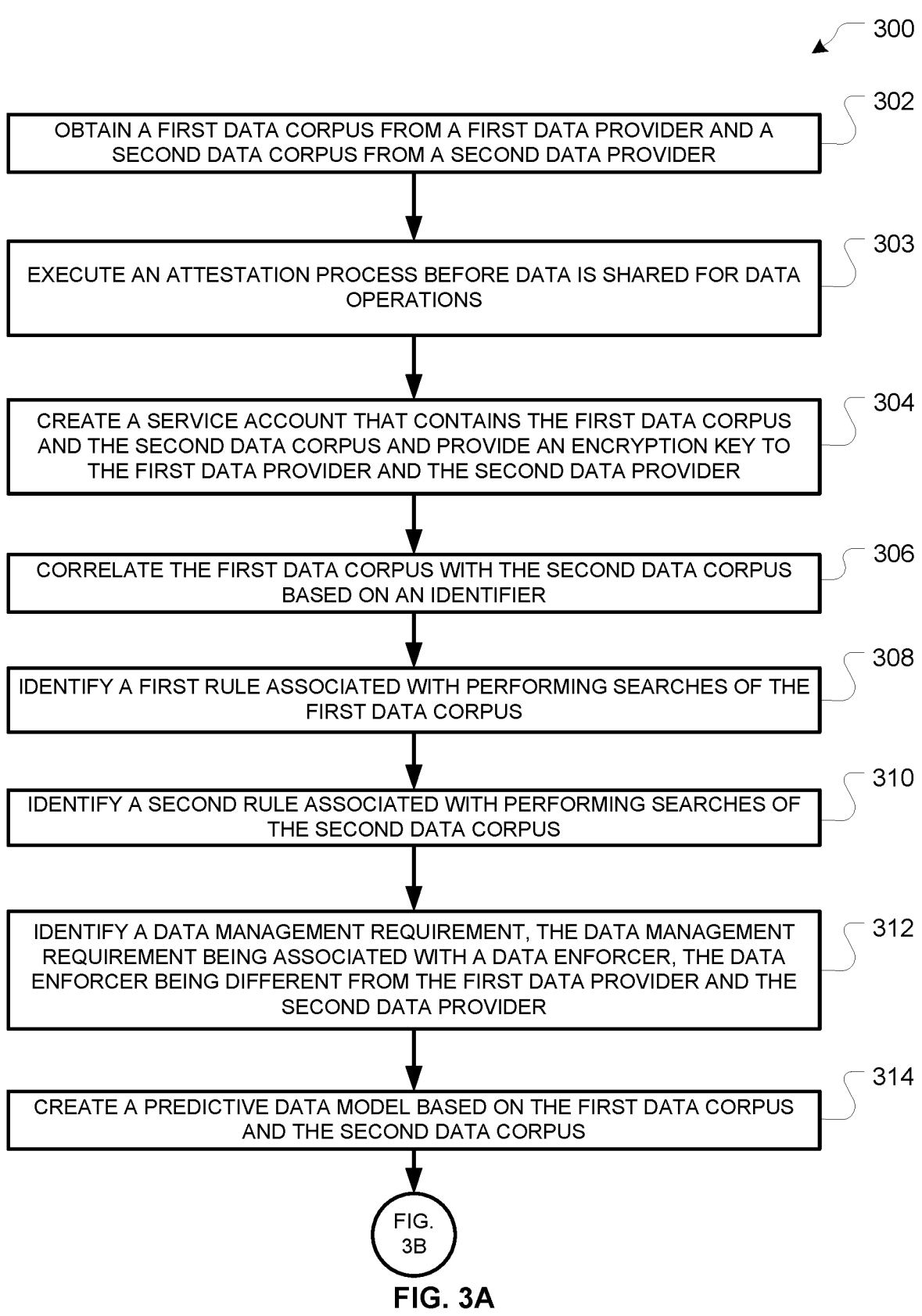
Figure 3B:
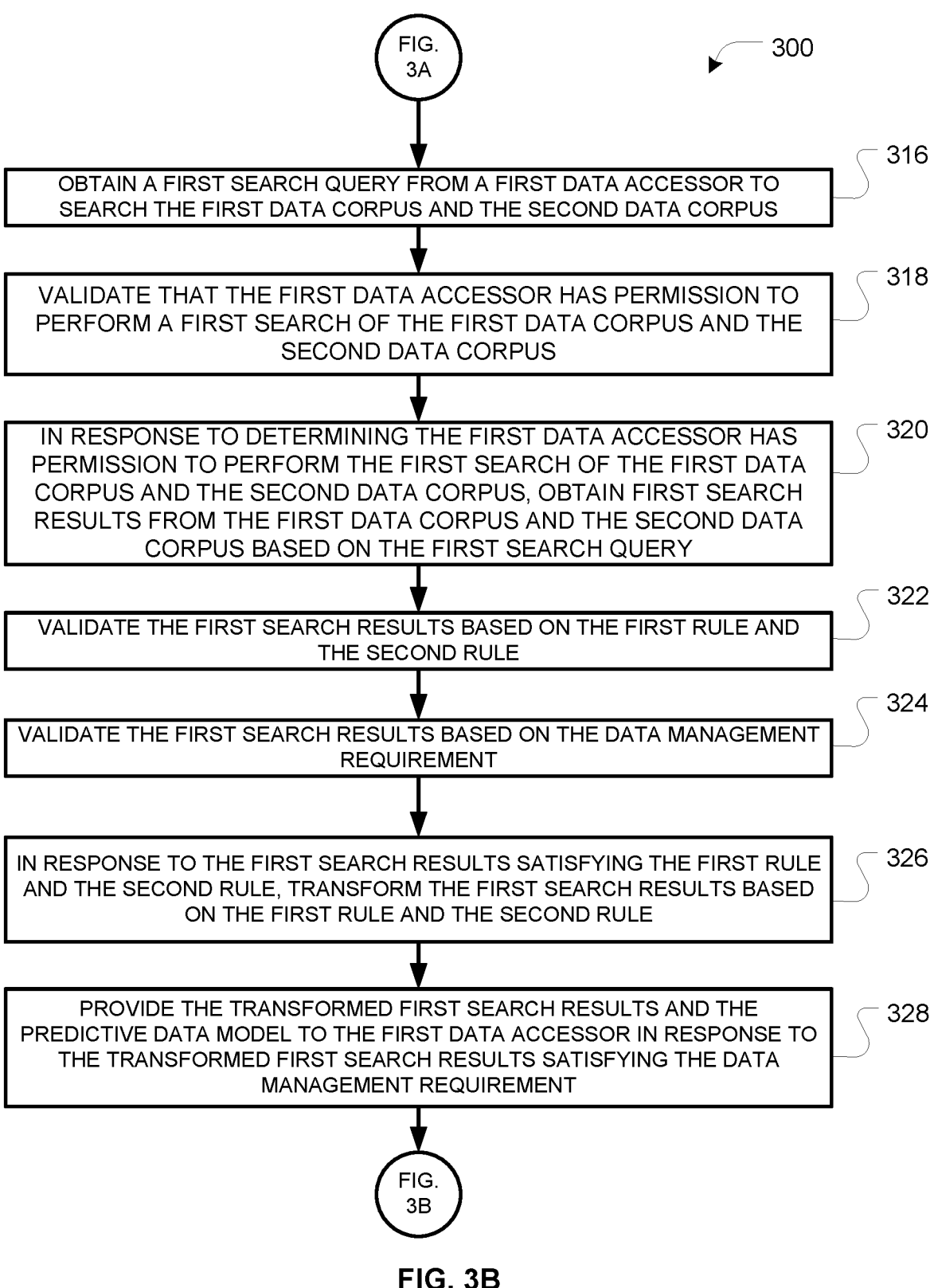
Figure 3C:
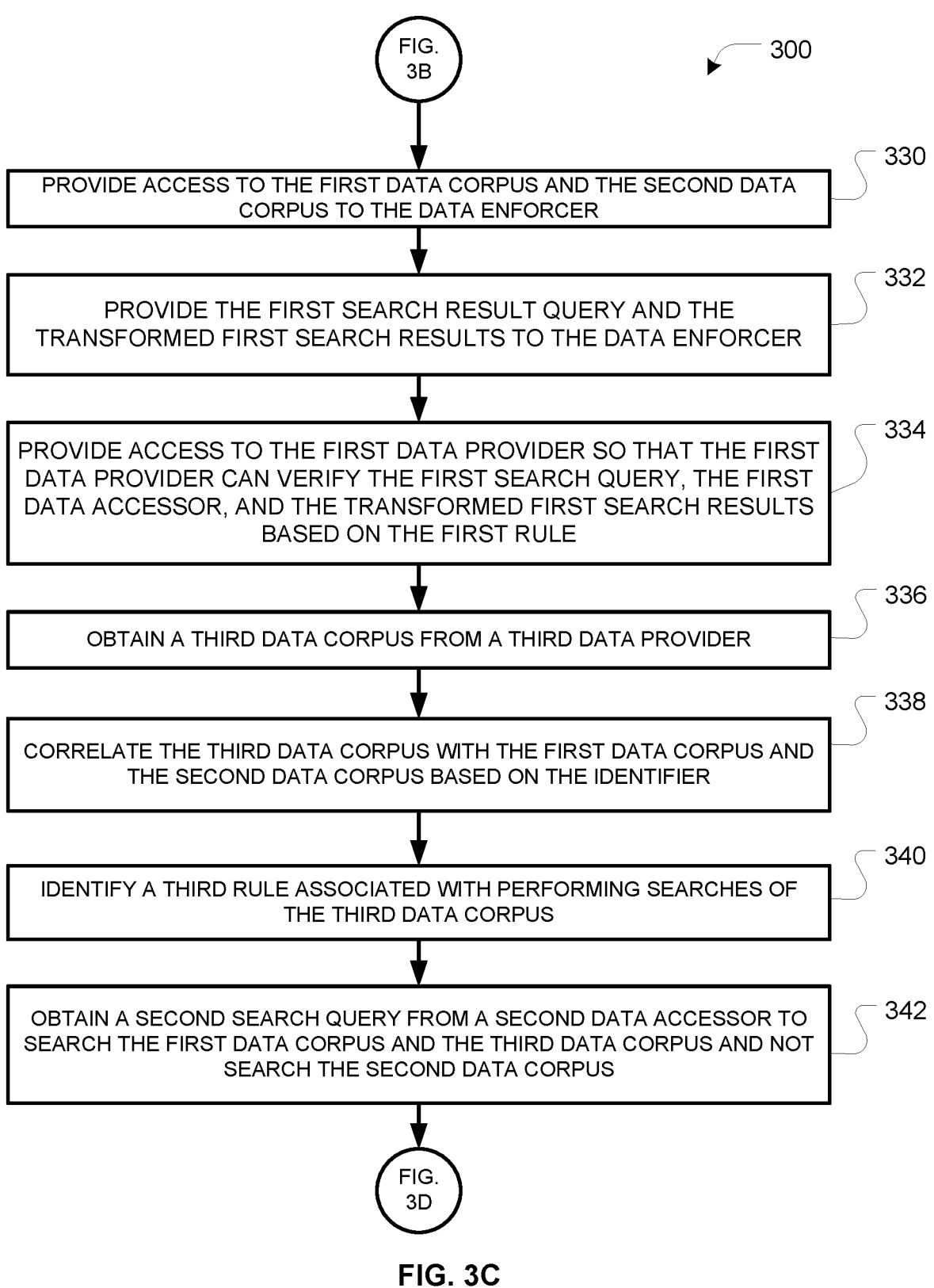

FIG. 2 illustrates an example system 200 related to performing a search in an electronic multi-tenant data management system. The system 200 may correspond with the data management system 160 of FIG. 1. In some embodiments, the system 200 may include a query analyzer 220, a query runner 230, a privacy sweep 240, and a result transformer 250.

The query analyzer 220 may include a circuit, code and/or computer instructions configured to operate the query analyzer 220 to receive a search query 210 and analyze the search query 210. The search query 210 may include a request to search for users of particular services at particular locations. The search query 210 may include a request to search any data corpora such as the data corpora 122 and/or data corpora 162 of FIG. 1. For example, the search query 210 may request a search of the data corpus associated with a particular data provider, such as the data corpus 1 122A associated with the data provider 1 120A of FIG. 1. In some embodiments, the query analyzer 220 may analyze the search query 210 based a set of data rules, such as the set of data rules 164 of FIG. 1, and based on data management requirements, such as the data management requirements 166 of FIG. 1. For example, a data accessor may submit a search query 210 that may request that a search be performed of the data corpus associated with a particular data provider. However, the data rules associated with the particular data provider may not authorize the data accessor to perform searches of the data corpus. The query analyzer may thus validate whether the data accessor has permission to perform a search of the data corpora listed in the search query 210.

If the query analyzer 220 determines that the search query 210 is not authorized, the query analyzer 220 may provide a message to the originator of the search query 210 indicating that the search failed and/or was not authorized. If the query analyzer 220 determines that the search query 210 is authorized and/or that the data accessor has permission to perform a search of the data corpora referenced in the search query 210, the query analyzer 220 may provide the search query 210 to the query runner 230.

The query analyzer 220 may also provide an authorization event or preauthorization event to the data providers 120 to attest that data rules 124 allow for the type of search query to be performed on the data corpora 122 before the data providers 120 allow the data corpora 122 to get used in a data operation, such as the search query.

Figure 6:
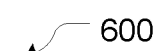
FIG. 6 illustrates an example flow diagram illustrating a method for performing an attestation process in relation to an electronic multi-tenant data management system.
Figure 6:
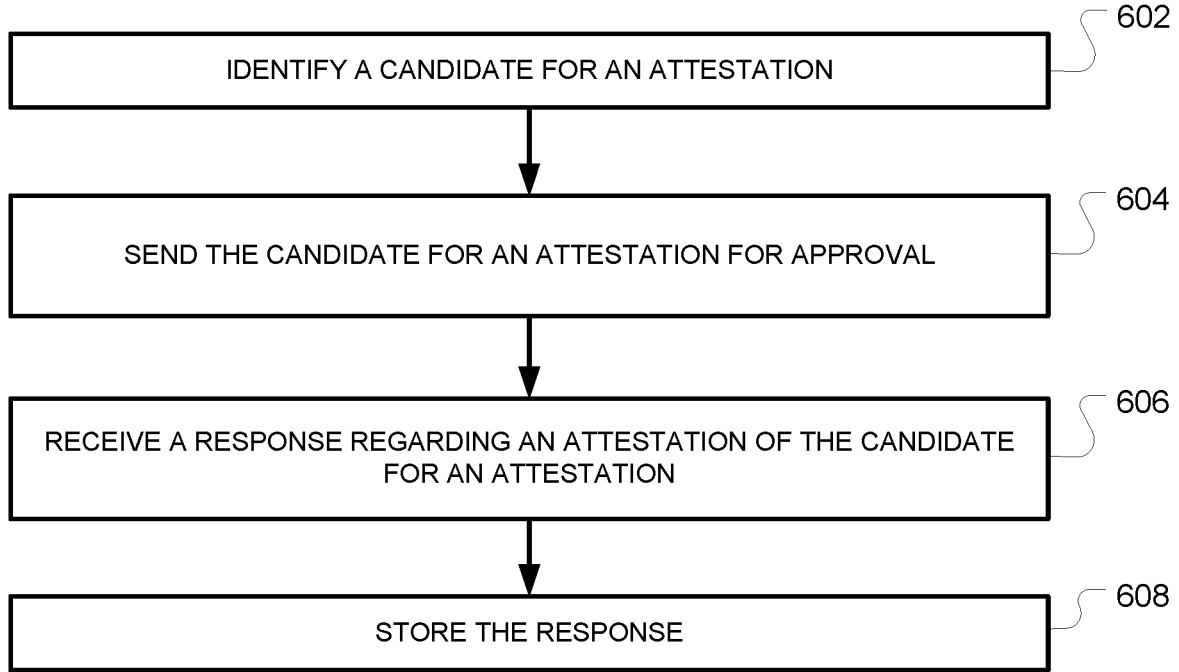

The query analyzer 220 may also include or execute an attestation process, such as the attestation process of FIG. 6, in which the data providers 120 may approve various data operations, such as new search queries, before allowing the data corpora 122, or their respective data corpus 122, to be used in the data operation. The attestation process can be fully or partially automated in which the data management system can adhere to the data rules 124 or a manual system in which a new search query is approved in advance with a transaction log record of the approval. Data providers 120 may, for example, attest that query inputs are compatible with the data provider business rules. Business rules may include acceptable parameter values, historical query comparisons, combinations of data providers, and/or analysis limitations, or any other business rule or set of business rules. The business rules can be used to ensure the data operations (e.g., search query) is conforming to an acceptable use policy. All query search history can be audited, allowing data providers 120 to continue to verify the attestation policy on past searches.

In some embodiments, the query analyzer 220 may also enforce throttling limits on the number and types of queries (or throttling of similar queries) that can be run in a specific time span. Some purposes of this is to prevent or minimize jitter attacks and to allow for tiered pricing for usage based cost models.

The query runner 230 may include a circuit, code and/or computer instructions configured to operate the query runner 230 to run the search query 210. The query runner 230 may perform a search using the search query 210 over the associated data corpora. As described, the search query 210 may include a list of data corpora to search and a list of terms, locations, data fields, etc. over which to search. The query runner 230 may perform the search using the search query 210 and may obtain search results from the data corpora referenced in the search query 210 and may provide the search results to the privacy sweep 240. For example, if the search query 210 includes a particular location and a particular behavior, the query runner 230 may identify all data in the data corpora that include the particular location and the particular behavior.

The privacy sweep 240 may include a circuit, code and/or computer instructions configured to operate the privacy sweep 240. The privacy sweep 240 may perform one or more operations on the search results to verify conformance with the data rules and/or data management requirements. For example, the number of search results may be lower than a required minimum number of search results as set by a data provider in a data rule. For example, the search query 210 may request to search the data corpus of a first data provider and the first data provider may have a data rule requiring at least one hundred results. If the number of results of performing a search using the search query 210 is less than one hundred, the privacy sweep 240 may indicate that the search using the search query 210 has failed the data rules and may return a message indicating that the search failed to the originator of the search query 210. In some embodiments, the privacy sweep 240 may perform multiple sweeps of the results of the search query 210. For example, in some embodiments, the privacy sweep 240 may perform a sweep for each data corpus which was searched using the search query 210. Thus, the privacy sweep 240 may validate the results of the search query 210 based on rules associated with each data corpus. For example, the search query 210 may request a search of the data corpus from a first data provider, the data corpus from a second data provider, and the data corpus from a third data provider. The privacy sweep 240 may perform a first sweep of the search results using the data rules of the first data provider, a second sweep of the search results using the data rules of the second data provider, and a third sweep of the search results using the data rules of the third data provider. In some embodiments, the privacy sweep 240 may also perform a sweep of the search results using the data management requirements. For example, the privacy sweep 240 may determine whether the search results include any personally identifying information.

If the privacy sweep 240 determines that the search results satisfy all of the relevant data rules and the data management requirements, the privacy sweep 240 may provide the search results to the result transformer 250. In at least one embodiment, failing to satisfy even one of many rules may cause the privacy sweep 240 to not provide (or not authorize provision of) the search results. The result transformer 250 may perform alterations to the data based on the data rules. For example, the data rules associated with one or more data providers may require that the data be fuzzed. As an example of fuzzing the data, a small and/or random amount may be added or subtracted from at least one portion of the actual search results. For example, if the data from a data provider include ad exposure data and the data provider has a rule that ad exposure data may be fuzzed by five minutes, each search result with ad exposure data may have a random amount from −5 minutes to +5 minutes added to the ad exposure data. Other data may also be fuzzed. For example, ages of individuals may be fuzzed by a year, by two years, or by any number of years. Random data records may also be inserted by data provider specific fuzzing logic. This allows the data providers to later filter out the fuzz they provided when they are also the data requester. Data providers may also use a sketch, sampling, a probabilistic privacy preserving model, or sample on the raw data. As an additional example of data rules, a data rule may require that data be grouped into buckets of a particular amount. For example, if the search results indicate that 97 users satisfy the search query and the data rule requires buckets of 30, the search results may be transformed to indicate that 90 users satisfy the search query. After performing transformations of the search results, the result transformer 250 may output transformed search results 260. In some embodiments, the result transformer 250 may provide the transformed search results 260 to the party that provided the search query 210 to the query analyzer 220.

Alternatively or additionally, in some embodiments, the transformed search results 260 may be used to identify potential targets for advertising. For example, the transformed search results 260 may include demographic information, subjects that are "liked" or "favorited", past purchase information, geographic information, frequency of use, and other information that may be used by a company to devise a marketing strategy. For example, a company may target particular channels, social media sites, and or topics to improve its visibility among segments of the population that are more likely to be interested in its products.

Alternatively or additionally, in some embodiments, the transformed search results 260 may be used in the creation of new products. For example, as described above, the transformed search results 260 may include a viewing history of the movies and/or television shows that individuals in a particular demographic have watched. By identifying common movies and/or television shows, a television producer may create a new television series to cater to the particular demographic.

Alternatively or additionally, in some embodiments, the transformed search results 260 may be used to identify segments of the population that may be at risk for physical and/or emotional disorders. For example, the transformed search results 260 may include information about individuals with a particular disorder. Using the customer data associated with these individuals, a health agency may identify particular character traits, interests, purchase histories, streaming histories, or other details that may correlate with the particular disorder.

Alternatively or additionally, in some embodiments, the transformed search results 260 may be provided to a data enforcer, such as the data enforcer 140 of FIG. 1. The search query 210 may also be provided to the data enforcer. In these and other embodiments, the data enforcer may also have access to the data corpora. The data enforcer may thus verify that the data management requirements are being satisfied.

Alternatively or additionally, in some embodiments, the transformed search results 260 may be provided to a data provider, such as the data provider 1 120A of FIG. 1. The data provider may have access to verify the search query 210, the data accessor who requested the search query 210, and the transformed search results 260.

In some embodiments, the search query 210 may include a request to search some data corpora but not others. In these and other embodiments, the query analyzer 220 may only validate the search query 210 based on data rules associated with the data corpora that the search query 210 requests to search. Similarly, the privacy sweep 240 may only perform sweeps relative to the data rules associated with the data corpora that are searched. Similarly, result transformer 250 may only transform the search results based on data rules associated with the data corpora that are searched.

Alternatively or additionally the data management system 160 may provide activity logs, exception logs, transaction logs, security logs, and/or data enforcement audit logs to the data providers 120 and the data accessor 130 to troubleshoot issues, ensure regulatory compliance, privacy, prevent tampering, and/or detect attacks, etc.

FIGS. 3A-3D illustrate an example flow diagram illustrating a method 300 for performing a search of an electronic multi-tenant data management system. The method may be performed by a circuit and/or processing logic that comprises hardware (e.g., circuitry, dedicated logic, programmable logic, microcode, etc.), software (e.g., instructions run on a processor to perform hardware simulation), or a combination thereof. Processing logic can control or interact with one or more devices, applications or user interfaces, or a combination thereof, to perform operations described herein. When presenting, receiving or requesting information from a user, processing logic can cause the one or more devices, applications or user interfaces to present information to the user and to receive information from the user.

For simplicity of explanation, the method of FIGS. 3A-3D is illustrated and described as a series of operations. However, acts in accordance with this disclosure can occur in various orders and/or concurrently and with other operations not presented and described herein. Further, not all illustrated operations may be required to implement the methods in accordance with the disclosed subject matter. In addition, those skilled in the art will understand and appreciate that the methods could alternatively be represented as a series of interrelated states via a state diagram or events.

At block 302, processing logic may obtain a first data corpus from a first data provider and a second data corpus from a second data provider.

At block 303, the processing logic may execute an attestation process before data is shared for data operations or correlation. Under the attestation process, the data providers 120 may attest or approve any operations, analyses, algorithms, etc. that that can operate on the data that they provide to the multi-tenant data management system. The attestation process may also approve or preapprove a code block, function, query, machine learning model, calculation, machine instructions, etc. that can operate on the data that they provide to the multi-tenant data management system. In at least some embodiments, the attestation process can attest that the code block or query is in an approved list before the data providers share their data into the multi-tenant data management system. In at least some embodiments, the processing logic may identify an attestation, such as by executing the attestation process, or by receiving the attestation from another source, for at least one of the first data corpus or the second data corpus. For example, the first data provider 120 may provide an attestation for the first data corpus. In another example, the attestation process may include a data provider attesting or approving the code block, function, query, machine learning model, calculation, machine instructions, etc. that can operate on their data before sharing it for correlation.

At block 304, the processing logic may create a service account that contains the first data corpus and the second data corpus and provide an encryption key to the first data provider and the second data provider.

At block 306, the processing logic may correlate the first data corpus with the second data corpus based on an identifier, such as a common value, or common join key, or a non-personally identifying identifier.

At block 308, the processing logic may identify a first rule associated with performing searches of the first data corpus. At block 310, the processing logic may identify a second rule associated with performing searches of the second data corpus. At block 312, the processing logic may identify a data management requirement. The data management requirement may be associated with a data enforcer. The data enforcer may be different from the first data provider and the second data provider.

At block 314, the processing logic may create a predictive data model based on the first data corpus and the second data corpus.

At block 316, the processing logic may obtain a first search query from a first data accessor to search the first data corpus and the second data corpus. At block 318, the processing logic may validate that the first data accessor has permission to perform a first search of the first data corpus and the second data corpus. At block 320, the processing logic may, in response to determining the first data accessor has permission to perform the first search of the first data corpus and the second data corpus, obtain first search results from the first data corpus and the second data corpus based on the first search query. At block 322, the processing logic may validate the first search results based on the first rule and the second rule. At block 324, the processing logic may validate the first search results based on the data management requirement. At block 326, the processing logic may, in response to the first search results satisfying the first rule and the second rule, transform the first search results based on the first rule and the second rule. At block 328, the processing logic may provide the transformed first search results to the first data accessor in response to the transformed first search results satisfying the data management requirement.

At block 330, the processing logic may provide access to the first data corpus and the second data corpus to the data enforcer. At block 332, the processing logic may provide the first search query and the transformed first search results to the data enforcer. At block 334, the processing logic may provide access to the first data provider so that the first data provider can verify the first search query, the first data accessor, and the transformed first search results based on the first rule.

At block 336, the processing logic may obtain a third data corpus from a third data provider. At block 338, the processing logic may correlate the third data corpus with the first data corpus and the second data corpus based on the identifier. At block 340, the processing logic may identify a third rule associated with performing searches of the third data corpus. At block 342, the processing logic may obtain a second search query from a second data accessor to search the first data corpus and the third data corpus and not search the second data corpus. At block 344, the processing logic may validate that the second data accessor has permission to perform a second search of the first data corpus and the third data corpus.

At block 346, the processing logic may, in response to determining the second data accessor has permission to perform the second search of the first data corpus and the third data corpus, obtain second search results from the first data corpus and the third data corpus based on the second search query. At block 348, the processing logic may validate the second search results based on the first rule and the third rule and may not validate the second search results based on the second rule. At block 350, the processing logic may, in response to the second search results satisfying the first rule and the third rule, transform the second search results based on the first rule and the third rule and may not transform the second search results based on the second rule. At block 352, the processing logic may provide the transformed second search results to the second data accessor.

Figure 4A:
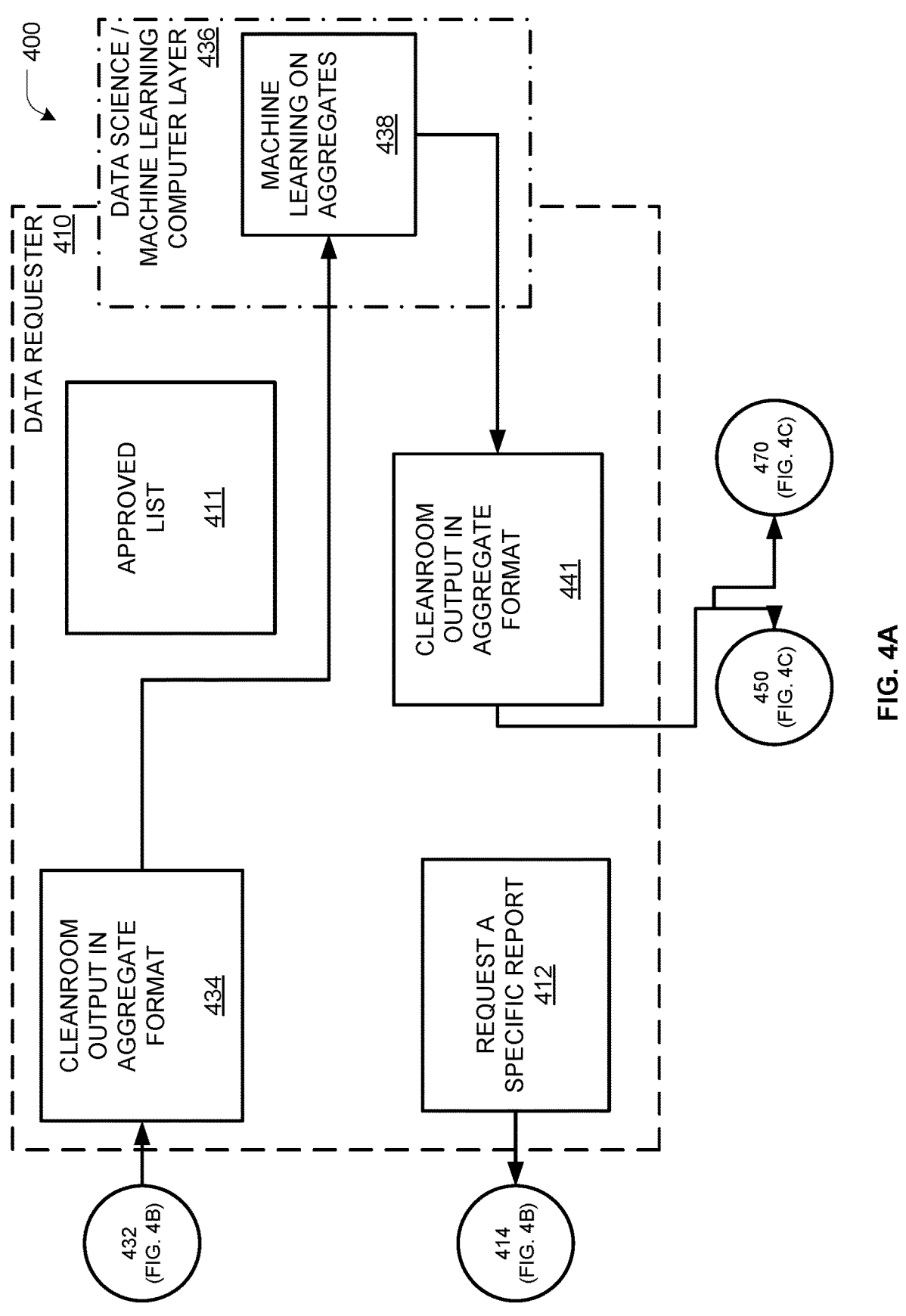
FIGS. 4A-C illustrate a flow diagram for a cleanroom according to the disclosure.
Figure 4B:
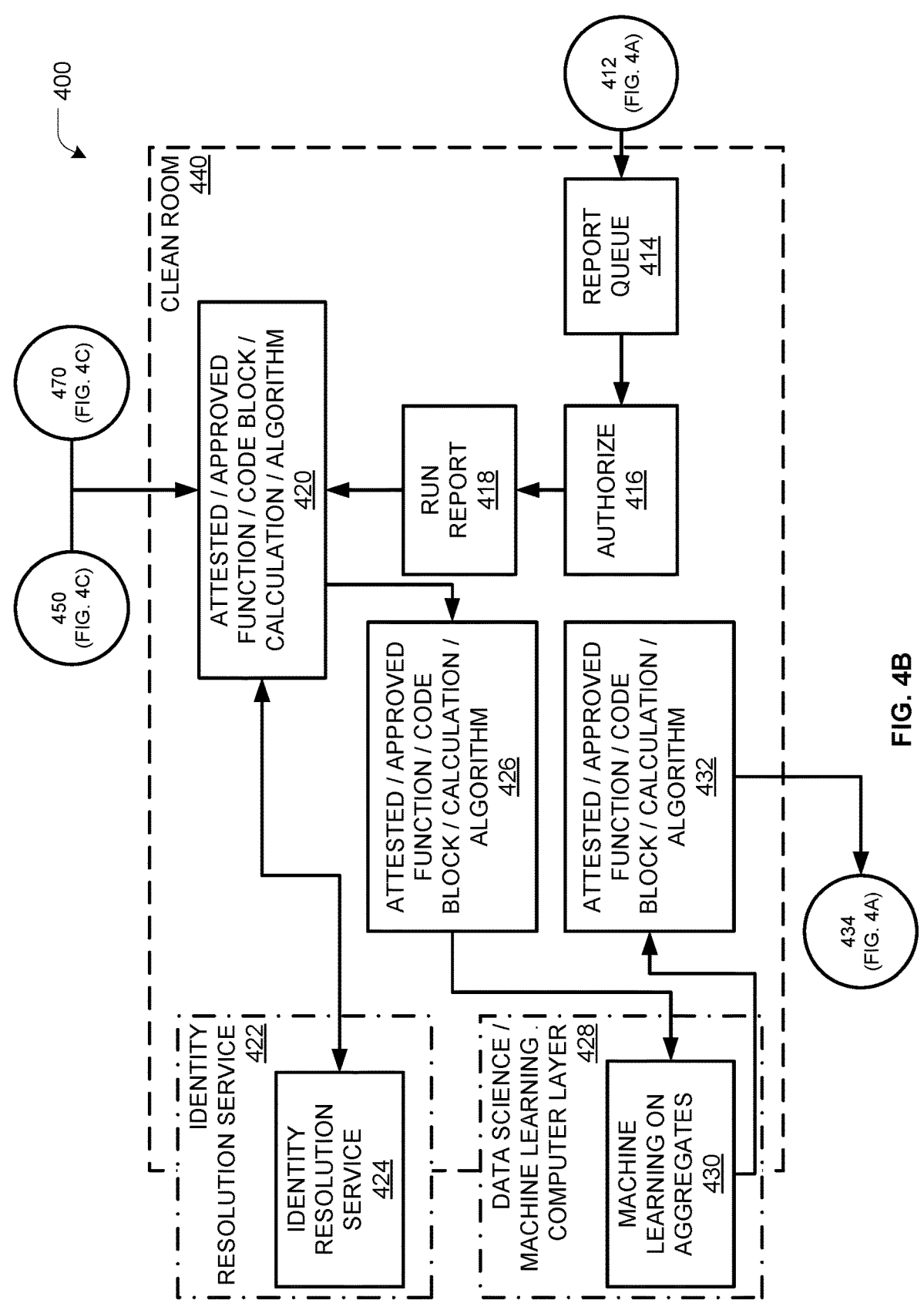
Figure 4C:
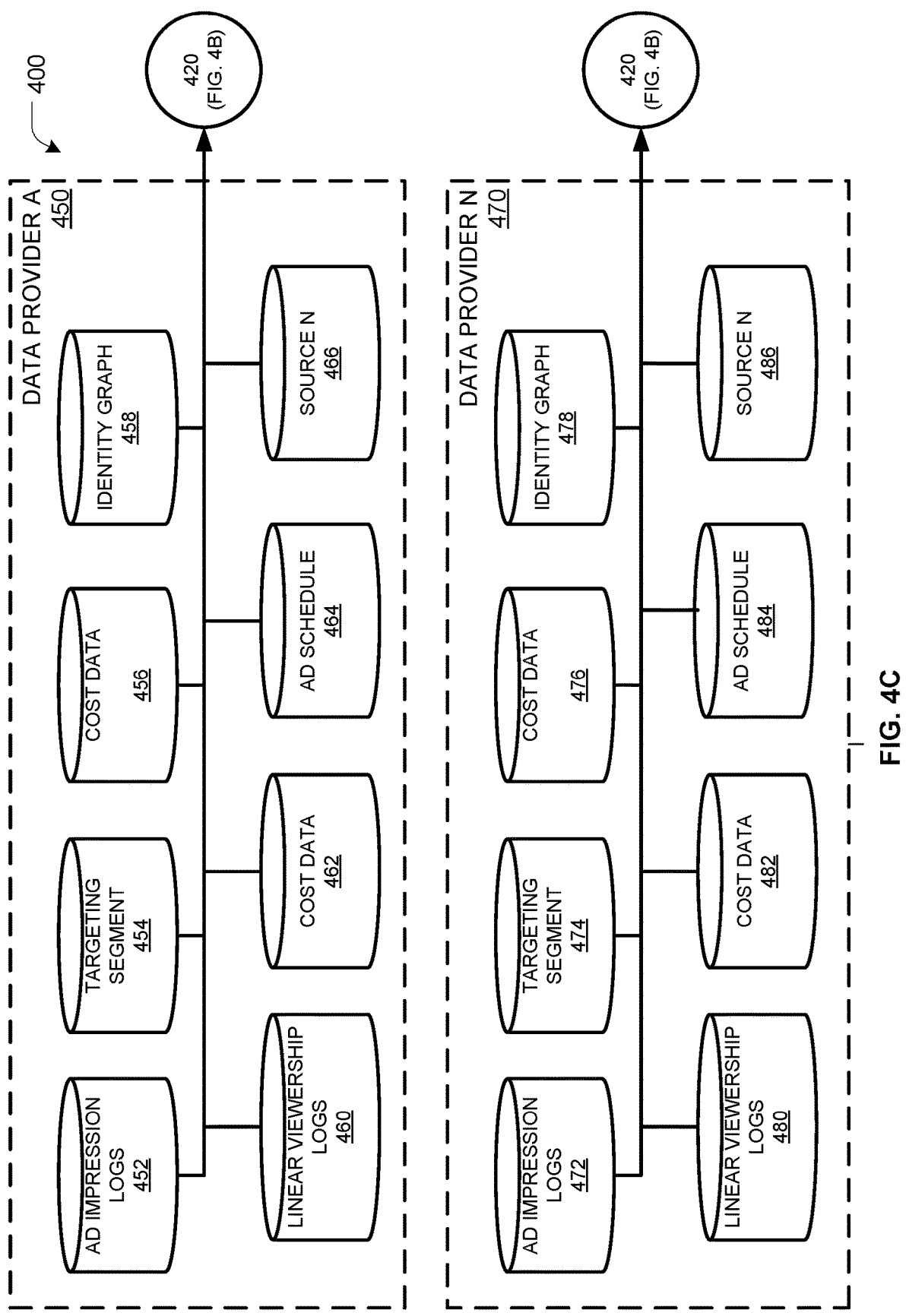

FIGS. 4A-C illustrate a flow diagram of the data flow process 400. Preliminarily, data may be provided to the process 400 by two or more data providers. Once data is provided, a party designated as a data requestor 410 can initiate the creation of a report 412. The data requestor may 410 also be a data provider. After requesting creation of a report, the report request is sent to an isolated compute environment (e.g., shared data space 152; cleanroom 440) to be queued for report creation 414. None of the parties (e.g., data provider 1 450 through data provider N 470, and/or any data requestor) have access to the isolated compute environment (cleanroom 440). The authorization step 416 ensures that the data accessor can run the specified report type and that the data accessor has access to the data provided by the two or more data providers. All data providers (e.g., data provider 1 450 through data provider N 470) must authorize the data accessor to run the report type being submitted, that their data can be correlated with other data providers for the specific report type being requested prior to the data being made available to the report request process. Data provider A 450 has a plurality of data types that can be received from the cleanroom output 441 or provided to the cleanroom 440. Suitable data types include, for example, ad impression logs 452, targeting segments 454, first cost data set 456, identity graphs 458, linear viewership logs 460, second cost data set 462, ad schedules 464 and source identification 466. Similarly, subsequent data providers, such as data provider N 470, can provide, for example, ad impression logs 472, targeting segments 474, first cost data set 476, identity graphs 478, linear viewership logs 480, second cost data set 482, ad schedules 484 and source identification 486. There can be multiple sources of cost data. Some sources of data may be more accurate than others. An example is a source that contains estimated cost for all television ads on all networks and a specific rate card that an advertiser paid for a specific network. This requires cascading logic to get the most accurate cost data. Data provider N may or may not provide their own ad schedule, for example, so this data may be obtained from a different data source.

The data requestor 410 can also create restrictions. Additionally, data providers 450, 470 can restrict access to the provided data. Restrictions to access can include, but are not limited to, restriction of the types of data that can be joined, the types of reports that can be produced, the types of metrics that can be calculated, which customers/accounts can access different types of reports, dimension sets that can be aggregated on, dimension values that can be filtered on, and any other restriction that can be enforced on the data, including other restrictions described elsewhere in this document. Data providers 450, 470 can also set minimum aggregation thresholds for specific dimension sets and data that does not satisfy the requirements of a minimum aggregation threshold can be still be reported in default aggregation bin. For example, a data provider may indicate that its data cannot be aggregated into a report unless there are four or more data sets from other data providers in the pool of data to be aggregated for the report. After the report is queued 414 and authorized 416, the report is run 418. The report is finally generated when the report reaches the top of the queue and enough compute resources are available.

Pre-approved/attested blocks of code/functions/SQL query/query template/machine instructions are authorized to operate on the data provided by the data providers 420. If a user was to gain root access to the secure compute environment (e.g., cleanroom 440) the user would not be able to access the raw data because only the blocks of code/functions/machine instructions that were approved by the data provider can access the raw data. The approval process can be manual or automated and data will not flow from the data provider to the cleanroom 440 unless the data provider authorizes that the machine instructions satisfy the data provider's security policy. At this juncture, minimum aggregation thresholds can be enforced to ensure that only aggregate data can leave the cleanroom 440. The code block/machine instructions that are approved/attested to access the raw data may just be a proxy to more advanced computations. This allows each data provider (e.g., data provider 1 450 through data provider N 470, data requestor) to enforce its security and data policies without requiring the data requestor share all source code and trade secrets that may be used in a report.

Identity resolution service 422 can be performed in the cleanroom 440 by pulling in identity graphs. Identity resolution service 422 outside 424 the cleanroom can also be used if the data providers attest the code block that calls the 3rd party identity resolution service does not violate its security policy and only subsets of raw data are sent to the 3rd party identity resolution service 422. Data fuzzing during identity resolution may also be supported to protect the universe of ids in a single report, campaign, data source, target segment, or audience.

Machine learning models and algorithms 428 can run inside and outside the cleanroom 440. If the machine learning model needs to run outside the cleanroom 440, then the data providers may attest that the machine instructions that call external services are sending data outside the cleanroom that satisfy their security policies 426, for example minimum aggregation thresholds are met before data can leave the cleanroom. Approximation functions may be used in this step and coefficients of the functions may get exported out of the cleanroom for further processing. Results of machine learning process may be pulled back into the cleanroom to support joining with the raw data for additional processing Before data leaves the cleanroom 440, data providers can always enforce minimum aggregation thresholds and any other data or security policies are met 432 because the data providers approve the blocks of code that can access raw data provided. The data requestor also has access to the output 434 of the cleanroom 440 if all the data and security policies are met. The data requestor may also perform additional computations on the results 436 using machine learning on the aggregates 438. The data requestor 410 may have an approved list, which may include a hash of machine instructions that may be allowed in 420, 426, 432, etc. For example, the approved list may include an approval of a code block or query.

After optionally performing additional computations 436, transaction logs, report results, errors, warnings, etc. may be shared back to the data providers. This can be used to help prevent jitter attacks because the data provider can terminate access to the raw data if some threshold of requests per nanosecond, millisecond, second, minute, hour, day, week, month, quarter, year, decade, etc. are exceeded. Any predefined amount of time can be used to enforce a throttling threshold. This information shared back can also be used for billing, quality assurance, marketing, or other business needs and shared in an aggregate format 440.

The data aggregation process can be operable to support an attestation and approval process. The attestation and approval process allows all parties to confirm a calculation/function/block of code/machine instructions can be performed on row level/granular data while only aggregates or models (data science model, approximation function, deterministic, or any non-deterministic model) can be removed from the cleanroom. Additionally, approval can be provided by a data provider or an authorized third party. Moreover, the attestation/approval process can be manual, automated, semi-automated, or some combination thereof In some implementations, attested and approved aggregate data can be pulled out of the cleanroom 440 for processing in another environment. Thereafter the processed data can be returned to the cleanroom. Once returned to the cleanroom, additional processing of the data can be performed with the raw row level sensitive data, including preliminary checks to verify data integrity for the data that was removed from the cleanroom. Asynchronous encryption, synchronous encryption, role based security, attribute based security, or filtering of data to only allow attested/approved functions in the cleanroom to have access to the raw row level data or only certain attributes/columns of raw data shared between parties can also be applied. Support for logging between the cleanroom and all parties (e.g., requestors and providers), can also be performed. Masking and/or filtering of data between parties can also be applied so that only the approved/attested functions can access raw aggregate data. Additionally, granular restrictions can be applied to the types of reports which can be generated from the data.

Once aggregated, the data can be used to provide reports for planning, forecasting, campaign optimizations, mixed media spend analysis, measurement, attribution, frequency capping, currency, identity resolution and targeting use cases.

Restrictions can also be applied to the sources of data, i.e. restrictions on which parties a data provider's data can be joined. For example, data provider A may allow their data to be anonymized and aggregated with data providers B and C but not data providers D and E.

The systems and methods can also support an authorization step to ensure attested function, report type, sources of data, aggregation threshold, dimension keys, dimension values are used in a calculation, function, or report. Moreover, authorization/attestation step may use a hash of the source code/function/machine instructions.

Join keys on can be used for mutual shared values between parties in the cleanroom or as a separate service to perform identity resolution in which the mutual shared identity values is pulled back into the cleanroom. Structured Query Language (SQL), SQL template, function, and code block can also be used in the cleanroom. Additionally, wrapper code can be created around an approved/attested function or code block at run time when a report is requested in order to enhance security by removing input parameters to the function to enhance the security of sharing it to be attested/approved. Code block/machine instructions that are approved/attested to access the raw data may also be a proxy to more advanced computations. This allows the data providers to enforce their security and data policies without requiring the data requestor to share all source code and trade secrets that may be used in a report Throttling restrictions can also be provided to prevent jitter attacks. Identity resolution in the cleanroom or separate identity resolution services outside the cleanroom may also be provided. In some instances, the use of data fuzzing during identity resolution can be used to protect the universe of IDs in a single report, campaign, data source, target segment, or audience. Separate machine learning services that accepts aggregate inputs can also be used. Moreover, separate machine learning services can run in and outside the cleanroom.

Approximation functions can also be used in the cleanroom and when exporting the coefficients of the functions to compute clusters outside the cleanroom. The use of approximation functions provides for further processing given that the data providers attest that whatever is shipped outside the cleanroom satisfies the data provider's security and data policies.

Data requester may or may not share aggregate data back to data providers. Data does not need to be shipped. Rather data can be natively ingested into the cleanroom. Additionally, real-time or near real-time reporting can be supported.

Event stream processing (ESP) can also be supported. The use of ESP allows the system to take action on a series of data points that originate from the system as it creates data.

In some embodiments, the cleanroom is an isolated compute environment that neither data requestors nor data providers have access to without authorization. The cleanroom may be a confidential compute environment in which all data is encrypted and only gets decrypted when the CPU performs a machine instruction with the data. Data can be encrypted with hardware or software. Transaction logs, report results, errors, warnings, etc. may be shared back to the data providers after the data leaves the cleanroom. This can be used to help prevent jitter attacks because the data provider can shut off access to the raw data if some threshold of requests per arbitrary unit of time such as nanosecond, millisecond, second, minute, hour, day, week, month, quarter, year, decade, etc. are exceeded. This information shared back to data providers can also be used for billing, quality assurance, marketing, or other business needs.

Figure 5:
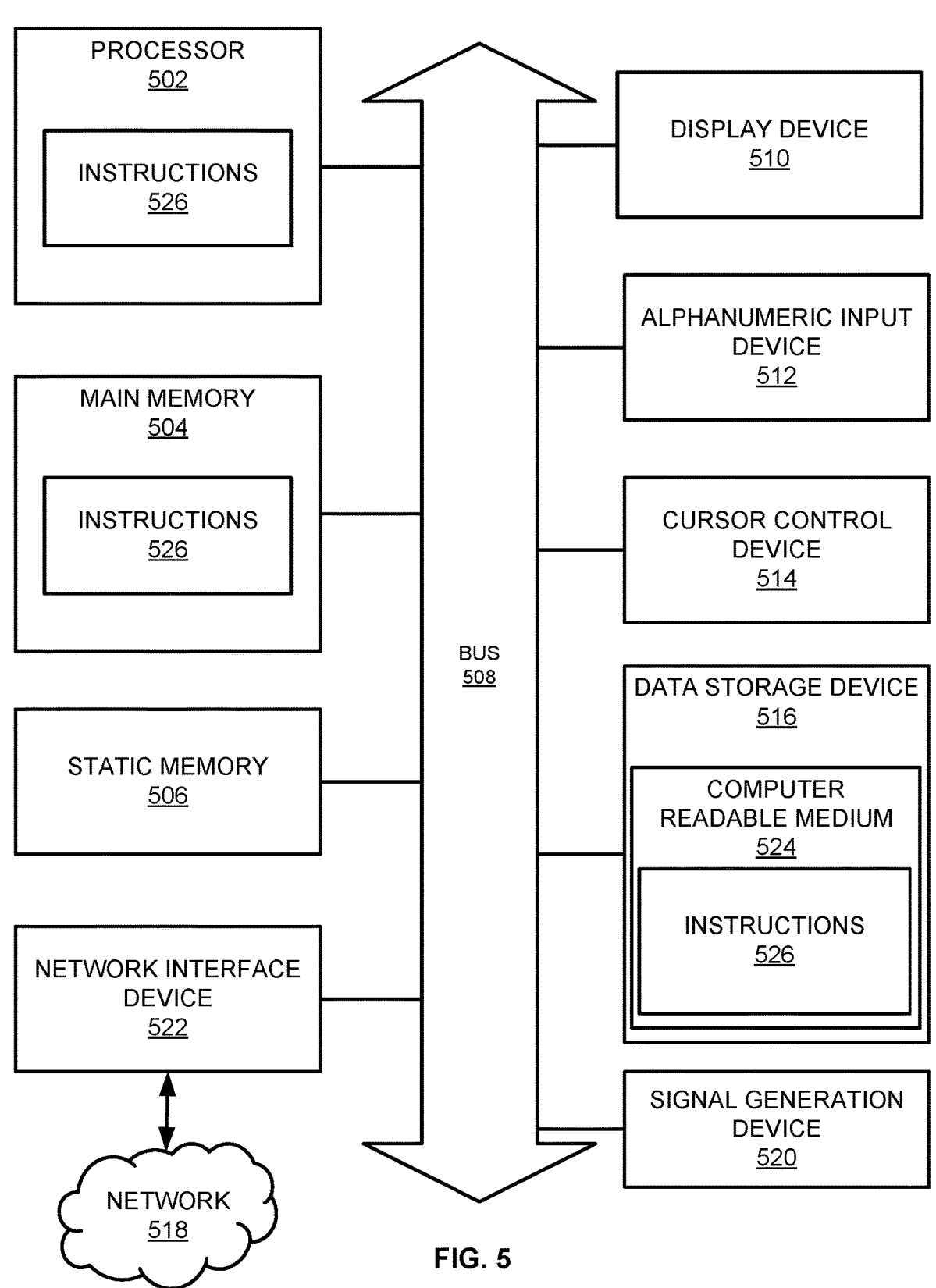
FIG. 5 illustrates an example computing device that may be used with an electronic multi-tenant data management system.

FIG. 5 illustrates a diagrammatic representation of a machine in the example form of a computing device 500 within which a set of instructions, for causing the machine to perform any one or more of the methodologies discussed herein, may be executed. The computing device 500 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a PC, a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 516, which communicate with each other via a bus 508.

Processing device 502 represents one or more processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computing device 500 may further include a network interface device 522 which may communicate with a network 518. The computing device 500 also may include a display device 510 (e.g., a liquid crystal display (LCD) or a cathode ray tube (CRT)), an alphanumeric input device 512 (e.g., a keyboard), a cursor control device 514 (e.g., a mouse) and a signal generation device 520 (e.g., a speaker). In one implementation, the display device 510, the alphanumeric input device 512, and the cursor control device 514 may be combined into a single component or device (e.g., an LCD touch screen).

The data storage device 516 may include a computer-readable storage medium 524 on which is stored one or more sets of instructions 526 embodying any one or more of the methodologies or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 518 via the network interface device 522.

While the computer-readable storage medium 524 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

FIG. 6 illustrates an example flow diagram illustrating a method 600 for performing an attestation process in relation to an electronic multi-tenant data management system. The method may be performed by a circuit and/or processing logic that comprises hardware (e.g., circuitry, dedicated logic, programmable logic, microcode, etc.), software (e.g., instructions run on a processor to perform hardware simulation), or a combination thereof. Processing logic can control or interact with one or more devices, applications or user interfaces, or a combination thereof, to perform operations described herein. When presenting, receiving or requesting information from a user, processing logic can cause the one or more devices, applications or user interfaces to present information to the user and to receive information from the user.

For simplicity of explanation, the method of FIG. 6 is illustrated and described as a series of operations. However, acts in accordance with this disclosure can occur in various orders and/or concurrently and with other operations not presented and described herein. Further, not all illustrated operations may be required to implement the methods in accordance with the disclosed subject matter. In addition, those skilled in the art will understand and appreciate that the methods could alternatively be represented as a series of interrelated states via a state diagram or events.

At block 602, processing logic may identify a candidate for an attestation. The candidate may include any code block, function, query, machine learning model, calculation, machine instructions, etc., which may be created or submitted by any party.

At block 604, the processing logic may send the candidate for an attestation to each data provider 120 for approval.

At block 606, the processing logic may receive a response regarding an attestation of the candidate for an attestation, which may include an approval or denial or a request for more information. The actual attestation may be automated, semi-automated, or manual review of candidate for attestation. The attestation review may include determining whether the candidate for attestation satisfies a privacy requirement, business rule, and/or data rule.

At block 608, the processing logic may store the response received at block 606. If the response includes an approval of the candidate for attestation, the processing logic may store the approval, such as in the data rules 124. In some embodiments, storing the approval may including generating and/or storing a one way hash or checksum of the instructions in the data rules 124 for each data provider 120 that approves.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "obtaining," "correlating," "determining," "validating," "receiving," "generating," "transforming," "requesting," "creating," "uploading," "adding," "presenting," "removing," "preventing," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a computer selectively activated or reconfigured by a computer program stored in the computer. Such a computer program may be stored in a non-transitory computer readable storage medium, such as, but not limited to, any type of disk including floppy disks, optical disks, compact disc read-only memories (CD-ROMs) and magnetic-optical disks, ROMs, RAMs, erasable programmable read-only memories (EPROMs), electrically erasable programmable read-only memories (EEPROMs), magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed:

1. A method comprising:
obtaining a first data corpus from a first data provider and a second data corpus from a second data provider, the first data corpus and the second data corpus both being encrypted by a same public key;
establishing a criteria for accessing the first data corpus and the second data corpus;
identifying an attestation for at least one of the first data corpus or the second data corpus, the attestation including a pre-approval that a particular type of request is permissible, the type of request including at least one of: a block of code; a function; a query; a query template; a report type, or a machine instruction;

correlating the first data corpus with the second data corpus;
generating a predictive model based on the first data corpus and the second data corpus;
receiving a request for a report from a first data requester;
determining whether to grant the request for the report by validating a first access criteria with the first data provider and a second access criteria with the second data provider, wherein validating the first access criteria includes determining that the report requested from the first data requester is of a type that has been pre-approved according to the attestation;
if the first access criteria and the second access criteria are met, generating the report, and if the first access criteria or the second access criteria are not met, rejecting the request for the report;
validating the report based on the first access criteria, the second access criteria, and a data management requirement;
transforming the report based on the first access criteria and the second access criteria; and
in response to the transformed report satisfying the data management requirement, providing the transformed report and the predictive model to the first data requester, wherein generating the report includes:
receiving a first private key from the first data provider and a second private key from the second data provider;
decrypting the first data corpus and the second data corpus using the public key, the first private key, and the second private key, and
wherein the report is generated in view of the decrypting.

2. The method of claim 1 wherein:
the data management requirement is associated with a data enforcer, the data enforcer being different from the first data provider and the second data provider.

3. The method of claim 2 further comprising:
providing access to the first data corpus and the second data corpus to the data enforcer; and
providing the request for the report to the data enforcer.

4. The method of claim 1 wherein correlating the first data corpus with the second data corpus:
identifying a first group of data in the first data corpus associated with a particular identifier;
identifying a second group of data in the second data corpus associated with the particular identifier; and
correlating the first group of data in the first data corpus with the second group of data in the second data corpus.

5. The method of claim 1 further comprising:
obtaining a third data corpus from a third data provider;
identifying a third access criteria of the third data corpus;
receiving a second request for a second report from the first data requester;
correlating the third data corpus with the first data corpus and the second data corpus;
determining whether the third access criteria is met; and
if the third access criteria is met, generating the second report, and if the third access criteria is not met, rejecting the second request.

6. The method of claim 1 further wherein the step of validating the first access criteria is performed by at least one of the first data provider and a first data provider validator, and the step of validating the second access criteria is performed by at least one of the second data provider and a second data provider validator.

7. The method of claim 1, wherein identifying the attestation includes:

identifying a candidate for the attestation;

sending the candidate for the attestation for approval;

receiving a response regarding the attestation of the candidate for the attestation, the response indicating that the particular type of request is permissible; and storing the response regarding the attestation.

8. The method of claim 1, wherein the attestation is received by the first data provider and the second data provider.

9. The method of claim 4, wherein the particular identifier is for an audience.

10. The method of claim 9, wherein correlating the first group of data in the first data corpus with the second group of data in the second data corpus includes correlating the first group of data and the second group of data with the audience.

11. A non-transitory computer-readable medium having encoded therein programming code executable by a processor to perform operations comprising:

obtain a first data corpus from a first data provider and a second data corpus from a second data provider, the first data corpus and the second data corpus are encrypted;

establish a criteria for accessing the first data corpus and the second data corpus;

correlate the first data corpus with the second data corpus;

generate a predictive model based on the first data corpus and the second data corpus;

receive a request for a report from a first data requester; and determine whether to grant the request for the report by validating a first access criteria with the first data provider and a second access criteria with the second data provider, wherein validating the first access criteria includes determining that the report requested from the first data requester is of a type that has been pre-approved according to an attestation;

if the first access criteria and the second access criteria are met, generating the report after decrypting the first data corpus and the second data corpus, and if the first access criteria or the second access criteria are not met, rejecting the request for the report;

validate the report based on the first access criteria, the second access criteria, and a data management requirement;

transform the report based on the first access criteria and the second access criteria; and in response to the transformed report satisfying the data management requirement, provide the transformed report and the predictive model to the first data requester.

12. The non-transitory computer-readable medium of claim 11 wherein:

the data management requirement is associated with a data enforcer, the data enforcer being different from the first data provider and the second data provider.

13. The non-transitory computer-readable medium of claim 12 further comprising:

provide access to the first data corpus and the second data corpus to the data enforcer; and provide a first search query and the first search results to the data enforcer.

14. The non-transitory computer-readable medium of claim 11 wherein correlating the first data corpus with the second data corpus:

identify a first group of data in the first data corpus associated with a particular identifier;

identify a second group of data in the second data corpus associated with the particular identifier; and correlate the first group of data in the first data corpus with the second group of data in the second data corpus.

15. The non-transitory computer-readable medium of claim 11 further comprising:

obtain a third data corpus from a third data provider;

identify a third access criteria of the third data corpus;

receive a second request for a second report from the first data requester;

correlating the third data corpus with the first data corpus and the second data corpus;

determine whether the third access criteria is met; and if the third access criteria is met, generating the second report, and if the third access criteria is not met, rejecting the second request.

16. The non-transitory computer-readable medium of claim 11 further wherein validation of the first access criteria is performed by at least one of the first data provider and a first data provider validator, and validation of the second access criteria is performed by at least one of the second data provider and a second data provider validator.

17. A system comprising one or more processors; and one or more computer-readable media configured to store instructions that in response to being executed by the one or more processors cause the system to perform operations, the operations comprising:

obtaining a first data corpus from a first data provider and a second data corpus from a second data provider;

establishing a criteria for accessing the first data corpus and the second data corpus;

correlating the first data corpus with the second data corpus;

generating a predictive model based on the first data corpus and the second data corpus;

receiving a request for a report from a first data requester;

determining whether to grant the request for the report by validating a first access criteria with the first data provider and a second access criteria with the second data provider, wherein validating the first access criteria includes determining that the report requested from the first data requester is of a type that has been pre-approved according to an attestation;

if the first access criteria and the second access criteria are met, generating the report after decrypting the first data corpus and the second data corpus, and if the first access criteria or the second access criteria are not met, rejecting the request for the report;

validating the report based on the first access criteria, the second access criteria, and a data management requirement; and transforming the report based on the first access criteria and the second access criteria.

18. The system of claim 17 wherein:

the data management requirement is associated with a data enforcer, the data enforcer being different from the first data provider and the second data provider.

19. The system of claim 18 further comprising:

providing access to the first data corpus and the second data corpus to the data enforcer; and providing a first search query and the first search results to the data enforcer.

20. The system of claim 17 wherein correlating the first data corpus with the second data corpus:

identifying a first group of data in the first data corpus associated with a particular identifier;

identifying a second group of data in the second data corpus associated with the particular identifier; and correlating the first group of data in the first data corpus with the second group of data in the second data corpus.

21. The system of claim 17 further comprising:

obtaining a third data corpus from a third data provider;

identifying a third access criteria of the third data corpus;

receiving a second request for a second report from the first data requester;

correlating the third data corpus with the first data corpus and the second data corpus;

determining whether the third access criteria is met; and if the third access criteria is met, generating the second report, and if the third access criteria is not met, rejecting the second request.

22. The system of claim 17 further wherein the step of validating the first access criteria is performed by at least one of the first data provider and a first data provider validator, and the step of validating the second access criteria is performed by at least one of the second data provider and a second data provider validator.

* * * * *